(12) United States Patent
Yerramalli et al.

(10) Patent No.: US 10,841,069 B2
(45) Date of Patent: Nov. 17, 2020

(54) PARTIAL SUBFRAME TRANSMISSION TECHNIQUES IN SHARED RADIO FREQUENCY SPECTRUM

(71) Applicant: QUALCOMM Incorporated, San Diego, CA (US)

(72) Inventors: Srinivas Yerramalli, San Diego, CA (US); Peter Gaal, San Diego, CA (US); Juan Montojo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/926,563

(22) Filed: Mar. 20, 2018

(65) Prior Publication Data

US 2018/0278403 A1    Sep. 27, 2018

Related U.S. Application Data

(60) Provisional application No. 62/476,664, filed on Mar. 24, 2017.

(51) Int. Cl.
*H04L 5/00* (2006.01)
*H04W 16/14* (2009.01)
(Continued)

(52) U.S. Cl.
CPC .......... *H04L 5/0094* (2013.01); *H04L 5/0044* (2013.01); *H04L 5/0053* (2013.01);
(Continued)

(58) Field of Classification Search
CPC .................................................... H04L 5/0094
(Continued)

(56) References Cited

U.S. PATENT DOCUMENTS

2015/0264662 A1\* 9/2015 Sahlin ............... H04W 72/1289
                                                            370/280
2016/0095104 A1\* 3/2016 Chen ...................... H04L 5/0048
                                                            370/329
(Continued)

FOREIGN PATENT DOCUMENTS

EP         3131223 A1      2/2017

OTHER PUBLICATIONS

International Search Report and Written Opinion—PCT/US2018/023464—ISA/EPO—dated Jun. 15, 2018.

*Primary Examiner* — Peter G Solinsky
(74) *Attorney, Agent, or Firm* — Holland & Hart LLP

(57) ABSTRACT

Techniques provide for identification of a starting location for a transmission that provides a relatively short time period between completion of a successful contention-based access procedure (e.g., a listen before talk (LBT) procedure) and transmission of data between a base station and a user equipment (UE). In the event that an LBT procedure is successfully completed after the start of a subframe, an indication of a transmission may be transmitted at one of a number of predetermined points within the subframe time duration. In some cases, two or more different partial subframe durations may be configured, and one or more different partial subframes may be used for transmissions until the start of a subsequent subframe. An uplink trigger may be transmitted in a partial subframe to indicate one or more of a starting point of the uplink wireless transmission or an ending point of the uplink wireless transmission.

22 Claims, 21 Drawing Sheets

(51) Int. Cl.
*H04W 74/08* (2009.01)
*H04L 27/00* (2006.01)
*H04W 72/04* (2009.01)
*H04W 72/14* (2009.01)

(52) U.S. Cl.
CPC .......... *H04L 5/0091* (2013.01); *H04L 5/0092* (2013.01); *H04L 27/0006* (2013.01); *H04W 16/14* (2013.01); *H04W 74/0833* (2013.01); *H04W 72/0446* (2013.01); *H04W 72/14* (2013.01); *H04W 74/0808* (2013.01)

(58) Field of Classification Search
USPC ........................................................ 370/329
See application file for complete search history.

(56) References Cited

U.S. PATENT DOCUMENTS

| | | | |
|---|---|---|---|
| 2017/0048884 A1* | 2/2017 | Jung | H04L 5/001 |
| 2017/0367058 A1* | 12/2017 | Pelletier | H04W 56/0045 |
| 2019/0037601 A1* | 1/2019 | Noh | H04W 72/0446 |
| 2019/0098658 A1* | 3/2019 | Noh | H04W 74/002 |
| 2019/0104540 A1* | 4/2019 | Karaki | H04W 72/1289 |
| 2019/0132103 A1* | 5/2019 | Yang | H04L 25/0226 |
| 2019/0174496 A1* | 6/2019 | Li | H04W 72/1268 |
| 2019/0320450 A1* | 10/2019 | Li | H04W 72/0446 |

* cited by examiner

PARTIAL SUBFRAME TRANSMISSION TECHNIQUES IN SHARED RADIO FREQUENCY SPECTRUM

CROSS REFERENCES

The present Application for Patent claims priority to U.S. Provisional Patent Application No. 62/476,664 by Yerramalli et al., entitled "Partial Subframe Transmission Techniques in Shared Radio Frequency Spectrum," filed Mar. 24, 2017, assigned to the assignee hereof.

BACKGROUND

The following relates generally to wireless communication, and more specifically to partial subframe transmission techniques in shared radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless systems may enable communication between a base station and a UE over shared or unlicensed radio frequency spectrum bands, or over different radio frequency spectrum bands (e.g., licensed radio frequency spectrum bands and unlicensed radio frequency spectrum bands). When using a shared or unlicensed radio frequency spectrum band, transmitters (e.g., UEs, base stations, or other network access devices) may perform contention-based channel access (e.g., by performing a listen before talk (LBT) procedure) according to contention-based rules that provide for fair channel access to transmitters that wish to use the shared radio frequency spectrum band.

SUMMARY

The described techniques relate to improved methods, systems, devices, or apparatuses that support partial subframe transmission techniques in shared radio frequency spectrum. Generally, the described techniques provide for identification of a starting location for a transmission that provides a relatively short time period between completion of a successful contention-based access procedure (e.g., a listen before talk (LBT) procedure) and transmission of data between a base station and a user equipment (UE). In some cases, transmissions between the base station and UE may use subframes that have a subframe time duration and that are synchronized between two or more transmitters that use shared radio frequency spectrum. In the event that an LBT procedure is successfully completed after the start of a subframe, an indication of a transmission may be transmitted at one of a number of predetermined points within the subframe time duration. In some cases, two or more different partial subframe durations may be configured, and one or more different partial subframes may be used for transmissions until the start of a subsequent subframe.

In some cases, a base station may provide an uplink grant to a UE, and the UE may start uplink transmissions based on an established timing between receiving the uplink grant and the start of the uplink transmissions. The uplink grant, in some cases, may be transmitted using a partial subframe, which may allow a UE to start uplink transmissions sooner than uplink transmissions would be started if the uplink grant were transmitted using a full subframe. In some cases, an uplink grant may be provided to a UE, and a separate trigger may be transmitted to initiate the uplink transmission, and the trigger may be transmitted in a partial subframe and may include an indication of a starting or ending position, or both, of the uplink transmission.

A method of wireless communication is described. The method may include identifying a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum, performing an LBT procedure to gain access to the shared radio frequency spectrum, determining that a starting position of a first transmission is within the first full subframe duration based on the LBT procedure, and transmitting, based at least in part on a location of the starting position within the first full subframe duration, the first transmission using a first partial subframe having the first partial subframe duration, a second partial subframe having the second partial subframe duration, or both the first partial subframe and the second partial subframe.

An apparatus for wireless communication is described. The apparatus may include means for identifying a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum, means for performing an LBT procedure to gain access to the shared radio frequency spectrum, means for determining that a starting position of a first transmission is within the first full subframe duration based on the LBT procedure, and means for transmitting, based at least in part on a location of the starting position within the first full subframe duration, the first transmission using a first partial subframe having the first partial subframe duration, a second partial subframe having the second partial subframe duration, or both the first partial subframe and the second partial subframe.

Another apparatus for wireless communication is described. The apparatus may include a processor, memory in electronic communication with the processor, and instructions stored in the memory. The instructions may be operable to cause the processor to identify a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum, perform an LBT procedure to gain access to the shared radio frequency spectrum, determine that a starting position of a first transmission is within the first full subframe duration based on the LBT procedure, and transmit, based at least in part on a location of the starting position within the first full subframe duration, the first transmission using a first partial subframe having the first partial subframe duration, a second partial subframe having the second partial subframe duration, or both the first partial subframe and the second partial subframe.

A non-transitory computer readable medium for wireless communication is described. The non-transitory computer-readable medium may include instructions operable to cause a processor to identify a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum, perform an LBT procedure to gain access to the shared radio frequency spectrum, determine that a starting position of a first transmission is within the first full subframe duration based on the LBT procedure, and transmit, based at least in part on a location of the starting position within the first full subframe duration, the first transmission using a first partial subframe having the first partial subframe duration, a second partial subframe having the second partial subframe duration, or both the first partial subframe and the second partial subframe.

In some examples of the method, apparatus, and non-transitory computer-readable medium described above, the determining includes determining that the starting position of the first transmission corresponds to a start of a slot within the full subframe duration, where the first partial subframe duration corresponds to a duration of the slot, and the transmitting includes transmitting the first transmission using the first partial subframe.

In some examples of the method, apparatus, and non-transitory computer-readable medium described above, the determining includes determining that a difference between the starting position of the first transmission and an end of the full subframe duration is less than the first partial subframe duration, and the transmitting includes transmitting the first transmission using the second partial subframe. In some examples of the method, apparatus, and non-transitory computer-readable medium described above, the second partial subframe duration corresponds to at least two (e.g., two or three) orthogonal frequency division multiplexed (OFDM) symbols.

In some examples of the method, apparatus, and non-transitory computer-readable medium described above, the determining includes determining that a difference between the starting position of the first transmission and an end of the full subframe duration is more than the first partial subframe duration, and the transmitting includes transmitting the first transmission using both the first partial subframe and the second partial subframe.

Some examples of the method, apparatus, and non-transitory computer-readable medium described above may further include processes, features, means, or instructions for transmitting a common reference signal such as a cell-specific reference signal (CRS) or a bandwidth part specific reference signal in an initial OFDM symbol of the first transmission to indicate the starting location. Some examples of the method, apparatus, and non-transitory computer-readable medium described above may further include processes, features, means, or instructions for transmitting a demodulation reference signal (DMRS) (e.g., a wideband DMRS) in an initial OFDM symbol of the first transmission to indicate the starting location.

Some examples of the method, apparatus, and non-transitory computer-readable medium described above may further include processes, features, means, or instructions for transmitting configuration information to a UE that indicates the first partial subframe duration and the second partial subframe duration. In some examples of the method, apparatus, and non-transitory computer-readable medium described above, the configuration information further indicates the second partial subframe may be transmitted at an end of the first full subframe duration. Some examples of the method, apparatus, and non-transitory computer-readable medium described above may further include processes, features, means, or instructions for scaling a transport block size based at least in part on the starting position.

A method of wireless communication is described. The method may include identifying a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum, monitoring transmissions in the shared radio frequency spectrum at a plurality of predefined time points of the full subframe duration for an indication of a first transmission, determining a starting position of the first transmission within the first full subframe duration based at least in part on a first time point of the plurality of predefined time points of the indication of the first transmission, and receiving, based at least in part on the starting position of the first transmission, the first transmission using a first partial subframe having the first partial subframe duration, a second partial subframe having the second partial subframe duration, or both the first partial subframe and the second partial subframe.

An apparatus for wireless communication is described. The apparatus may include means for identifying a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum, means for monitoring transmissions in the shared radio frequency spectrum at a plurality of predefined time points of the full subframe duration for an indication of a first transmission, means for determining a starting position of the first transmission within the first full subframe duration based at least in part on a first time point of the plurality of predefined time points of the indication of the first transmission, and means for receiving, based at least in part on the starting position of the first transmission, the first transmission using a first partial subframe having the first partial subframe duration, a second partial subframe having the second partial subframe duration, or both the first partial subframe and the second partial subframe.

Another apparatus for wireless communication is described. The apparatus may include a processor, memory in electronic communication with the processor, and instructions stored in the memory. The instructions may be operable to cause the processor to identify a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum, monitor transmissions in the shared radio frequency spectrum at a plurality of predefined time points of the full subframe duration for an indication of a first transmission, determine a starting position of the first transmission within the first full subframe duration based at least in part on a first time point of the plurality of predefined time points of the indication of the first transmission, and receive, based at least in part on the starting position of the first transmission, the first transmission using a first partial subframe having the first partial subframe duration, a second partial subframe having the second partial subframe duration, or both the first partial subframe and the second partial subframe.

A non-transitory computer readable medium for wireless communication is described. The non-transitory computer-readable medium may include instructions operable to cause a processor to identify a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum, monitor transmissions in the shared radio frequency spectrum at a plurality of predefined time points of the full subframe duration for an indication of a first transmission, determine a starting position of the first transmission within the first full subframe duration based at least in part on a first time point of the plurality of predefined time points of the indication of the first transmission, and receive, based at least in part on the starting position of the first transmission, the first transmission using a first partial subframe having the first partial subframe duration, a second partial subframe having the second partial subframe duration, or both the first partial subframe and the second partial subframe.

In some examples of the method, apparatus, and non-transitory computer-readable medium described above, the determining includes determining that the starting position of the first transmission corresponds to a start of a slot within the full subframe duration, where the first partial subframe duration corresponds to a duration of the slot, and the receiving includes receiving the first transmission using the first partial subframe.

In some examples of the method, apparatus, and non-transitory computer-readable medium described above, the determining includes determining that a difference between the starting position of the first transmission and an end of the full subframe duration is less than the first partial subframe duration, and the receiving includes receiving the first transmission using the second partial subframe. In some examples of the method, apparatus, and non-transitory computer-readable medium described above, the second partial subframe duration corresponds to three OFDM symbols. In some examples of the method, apparatus, and non-transitory computer-readable medium described above, the second partial subframe duration corresponds to two OFDM symbols.

In some examples of the method, apparatus, and non-transitory computer-readable medium described above, the determining includes determining that a difference between the starting position of the first transmission and an end of the full subframe duration is more than the first partial subframe duration, and the receiving includes receiving the first transmission using both the first partial subframe and the second partial subframe.

Some examples of the method, apparatus, and non-transitory computer-readable medium described above may further include processes, features, means, or instructions for monitoring the plurality of predefined time points for a CRS that indicates the starting position. Some examples of the method, apparatus, and non-transitory computer-readable medium described above may further include processes, features, means, or instructions for monitoring the plurality of predefined time points for a DMRS in an initial OFDM symbol of the first transmission to indicate the starting position.

Some examples of the method, apparatus, and non-transitory computer-readable medium described above may further include processes, features, means, or instructions for receiving configuration information that indicates the first partial subframe duration and the second partial subframe duration. In some examples of the method, apparatus, and non-transitory computer-readable medium described above, the configuration information further indicates the second partial subframe may be transmitted at an end of the first full subframe duration.

Some examples of the method, apparatus, and non-transitory computer-readable medium described above may further include processes, features, means, or instructions for identifying a transport block size (TBS) scaling factor based at least in part on the starting position. Some examples of the method, apparatus, and non-transitory computer-readable medium described above may further include processes, features, means, or instructions for decoding the received first transmission based at least in part on the TBS scaling factor.

A method of wireless communication is described. The method may include identifying a full subframe duration for use in wireless transmissions using shared radio frequency spectrum, a starting point of the full subframe duration being synchronized among two or more transmitters using the shared radio frequency spectrum, performing an LBT procedure to gain access to the shared radio frequency spectrum, determining that a starting position of a first transmission is within the first full subframe duration based on the LBT procedure, configuring a partial subframe for the first transmission having a partial subframe duration based at least in part on a difference between the starting position within the first full subframe duration and the full subframe duration, and transmitting an indication of the partial subframe duration in a control channel transmission associated with the first transmission.

An apparatus for wireless communication is described. The apparatus may include means for identifying a full subframe duration for use in wireless transmissions using shared radio frequency spectrum, a starting point of the full subframe duration being synchronized among two or more transmitters using the shared radio frequency spectrum, means for performing an LBT procedure to gain access to the shared radio frequency spectrum, means for determining that a starting position of a first transmission is within the first full subframe duration based on the LBT procedure, means for configuring a partial subframe for the first transmission having a partial subframe duration based at least in part on a difference between the starting position within the first full subframe duration and the full subframe duration, and means for transmitting an indication of the partial subframe duration in a control channel transmission associated with the first transmission.

Another apparatus for wireless communication is described. The apparatus may include a processor, memory in electronic communication with the processor, and instructions stored in the memory. The instructions may be operable to cause the processor to identify a full subframe duration for use in wireless transmissions using shared radio frequency spectrum, a starting point of the full subframe duration being synchronized among two or more transmitters using the shared radio frequency spectrum, perform an LBT procedure to gain access to the shared radio frequency spectrum, determine that a starting position of a first transmission is within the first full subframe duration based on the LBT procedure, configure a partial subframe for the first transmission having a partial subframe duration based at least in part on a difference between the starting position within the first full subframe duration and the full subframe duration, and transmit an indication of the partial subframe duration in a control channel transmission associated with the first transmission.

A non-transitory computer readable medium for wireless communication is described. The non-transitory computer-readable medium may include instructions operable to cause a processor to identify a full subframe duration for use in wireless transmissions using shared radio frequency spectrum, a starting point of the full subframe duration being synchronized among two or more transmitters using the shared radio frequency spectrum, perform an LBT procedure to gain access to the shared radio frequency spectrum, determine that a starting position of a first transmission is within the first full subframe duration based on the LBT procedure, configure a partial subframe for the first transmission having a partial subframe duration based at least in part on a difference between the starting position within the first full subframe duration and the full subframe duration, and transmit an indication of the partial subframe duration in a control channel transmission associated with the first transmission.

In some examples of the method, apparatus, and non-transitory computer-readable medium described above, the indication of the partial subframe duration includes downlink control information (DCI) that indicates the partial subframe duration. In some examples of the method, apparatus, and non-transitory computer-readable medium described above, the partial subframe duration corresponds to a number of OFDM symbols between the indication and an end of the full subframe duration. In some examples of the method, apparatus, and non-transitory computer-readable medium described above, the partial subframe duration corresponds to an integer number of two-OFDM-symbol TTIs.

A method of wireless communication is described. The method may include identifying a full subframe duration for use in wireless transmissions using shared radio frequency spectrum, a starting point of the full subframe duration being synchronized among two or more transmitters using the shared radio frequency spectrum, monitoring transmissions in the shared radio frequency spectrum at a plurality of predefined time points of the full subframe duration for an indication of a starting position of a first transmission, determining a partial subframe duration for the first transmission based at least in part on a difference between the starting position within the first full subframe duration and the full subframe duration, and receiving the first transmission using a first partial subframe having the partial subframe duration.

An apparatus for wireless communication is described. The apparatus may include means for identifying a full subframe duration for use in wireless transmissions using shared radio frequency spectrum, a starting point of the full subframe duration being synchronized among two or more transmitters using the shared radio frequency spectrum, means for monitoring transmissions in the shared radio frequency spectrum at a plurality of predefined time points of the full subframe duration for an indication of a starting position of a first transmission, means for determining a partial subframe duration for the first transmission based at least in part on a difference between the starting position within the first full subframe duration and the full subframe duration, and means for receiving the first transmission using a first partial subframe having the partial subframe duration.

Another apparatus for wireless communication is described. The apparatus may include a processor, memory in electronic communication with the processor, and instructions stored in the memory. The instructions may be operable to cause the processor to identify a full subframe duration for use in wireless transmissions using shared radio frequency spectrum, a starting point of the full subframe duration being synchronized among two or more transmitters using the shared radio frequency spectrum, monitor transmissions in the shared radio frequency spectrum at a plurality of predefined time points of the full subframe duration for an indication of a starting position of a first transmission, determine a partial subframe duration for the first transmission based at least in part on a difference between the starting position within the first full subframe duration and the full subframe duration, and receive the first transmission using a first partial subframe having the partial subframe duration.

A non-transitory computer readable medium for wireless communication is described. The non-transitory computer-readable medium may include instructions operable to cause a processor to identify a full subframe duration for use in wireless transmissions using shared radio frequency spectrum, a starting point of the full subframe duration being synchronized among two or more transmitters using the shared radio frequency spectrum, monitor transmissions in the shared radio frequency spectrum at a plurality of predefined time points of the full subframe duration for an indication of a starting position of a first transmission, determine a partial subframe duration for the first transmission based at least in part on a difference between the starting position within the first full subframe duration and the full subframe duration, and receive the first transmission using a first partial subframe having the partial subframe duration.

In some examples of the method, apparatus, and non-transitory computer-readable medium described above, the partial subframe spans an entire duration between the starting position and an end of the full subframe duration. In some examples of the method, apparatus, and non-transitory computer-readable medium described above, the partial subframe duration corresponds to a number of OFDM symbols between the indication and an end of the full subframe duration. In some examples of the method, apparatus, and non-transitory computer-readable medium described above, the partial subframe duration corresponds to an integer number of two-OFDM-symbol TTIs.

A method of wireless communication is described. The method may include transmitting an uplink grant for uplink data that is to be transmitted in an uplink wireless transmission using a shared radio frequency spectrum band, configuring two or more partial subframes within a full subframe duration for use in wireless transmissions using the shared radio frequency spectrum band, at least one of the two or more partial subframes configured as a downlink partial subframe, and transmitting a trigger for the uplink grant in the downlink partial subframe, the trigger indicating one or more of a starting point of the uplink wireless transmission or an ending point of the uplink wireless transmission.

An apparatus for wireless communication is described. The apparatus may include means for transmitting an uplink grant for uplink data that is to be transmitted in an uplink wireless transmission using a shared radio frequency spectrum band, means for configuring two or more partial subframes within a full subframe duration for use in wireless transmissions using the shared radio frequency spectrum band, at least one of the two or more partial subframes configured as a downlink partial subframe, and means for transmitting a trigger for the uplink grant in the downlink partial subframe, the trigger indicating one or more of a starting point of the uplink wireless transmission or an ending point of the uplink wireless transmission.

Another apparatus for wireless communication is described. The apparatus may include a processor, memory in electronic communication with the processor, and instructions stored in the memory. The instructions may be operable to cause the processor to transmit an uplink grant for uplink data that is to be transmitted in an uplink wireless transmission using a shared radio frequency spectrum band, configure two or more partial subframes within a full subframe duration for use in wireless transmissions using the shared radio frequency spectrum band, at least one of the two or more partial subframes configured as a downlink partial subframe, and transmit a trigger for the uplink grant in the downlink partial subframe, the trigger indicating one or more of a starting point of the uplink wireless transmission or an ending point of the uplink wireless transmission.

A non-transitory computer readable medium for wireless communication is described. The non-transitory computer-readable medium may include instructions operable to cause a processor to transmit an uplink grant for uplink data that is to be transmitted in an uplink wireless transmission using a shared radio frequency spectrum band, configure two or more partial subframes within a full subframe duration for use in wireless transmissions using the shared radio frequency spectrum band, at least one of the two or more partial subframes configured as a downlink partial subframe, and transmit a trigger for the uplink grant in the downlink partial subframe, the trigger indicating one or more of a starting point of the uplink wireless transmission or an ending point of the uplink wireless transmission.

Some examples of the method, apparatus, and non-transitory computer-readable medium described above may further include processes, features, means, or instructions for determining a total duration of the uplink grant, where the trigger indicates the starting point and the total duration of the uplink grant. Some examples of the method, apparatus, and non-transitory computer-readable medium described above may further include processes, features, means, or instructions for configuring an ending subframe of the uplink grant to be a partial subframe, where the trigger indicates the configuration of the ending subframe.

Some examples of the method, apparatus, and non-transitory computer-readable medium described above may further include processes, features, means, or instructions for receiving the uplink transmission, where the starting point of the uplink wireless transmission may be in a second partial subframe following the downlink partial subframe.

In some examples of the method, apparatus, and non-transitory computer-readable medium described above, the trigger indicates that the uplink grant includes one or more slot TTIs, one or more two-symbol TTIs, or a combination thereof.

In some examples of the method, apparatus, and non-transitory computer-readable medium described above, the data transmitted in the uplink wireless transmission may be jointly encoded across two or more TTIs. Some examples of the method, apparatus, and non-transitory computer-readable medium described above may further include processes, features, means, or instructions for configuring uplink control information (UCI) to be transmitted during one or more of the TTIs.

A method of wireless communication is described. The method may include receiving a first downlink partial subframe in a downlink wireless transmission using a shared radio frequency spectrum band, identifying a trigger to initiate uplink transmissions of an uplink grant in the first downlink partial subframe, the trigger indicating one or more of a starting point of an uplink wireless transmission or an ending point of the uplink wireless transmission, and transmitting the uplink wireless transmission based at least in part on the uplink grant and the trigger.

An apparatus for wireless communication is described. The apparatus may include means for receiving a first downlink partial subframe in a downlink wireless transmission using a shared radio frequency spectrum band, means for identifying a trigger to initiate uplink transmissions of an uplink grant in the first downlink partial subframe, the trigger indicating one or more of a starting point of an uplink wireless transmission or an ending point of the uplink wireless transmission, and means for transmitting the uplink wireless transmission based at least in part on the uplink grant and the trigger.

Another apparatus for wireless communication is described. The apparatus may include a processor, memory in electronic communication with the processor, and instructions stored in the memory. The instructions may be operable to cause the processor to receive a first downlink partial subframe in a downlink wireless transmission using a shared radio frequency spectrum band, identify a trigger to initiate uplink transmissions of an uplink grant in the first downlink partial subframe, the trigger indicating one or more of a starting point of an uplink wireless transmission or an ending point of the uplink wireless transmission, and transmit the uplink wireless transmission based at least in part on the uplink grant and the trigger.

A non-transitory computer readable medium for wireless communication is described. The non-transitory computer-readable medium may include instructions operable to cause a processor to receive a first downlink partial subframe in a downlink wireless transmission using a shared radio frequency spectrum band, identify a trigger to initiate uplink transmissions of an uplink grant in the first downlink partial subframe, the trigger indicating one or more of a starting point of an uplink wireless transmission or an ending point of the uplink wireless transmission, and transmit the uplink wireless transmission based at least in part on the uplink grant and the trigger.

In some examples of the method, apparatus, and non-transitory computer-readable medium described above, the trigger indicates the starting point and a total duration of the uplink grant. Some examples of the method, apparatus, and non-transitory computer-readable medium described above may further include processes, features, means, or instructions for determining that an ending subframe of the uplink grant may be an uplink partial subframe or an uplink full subframe based at least in part on information in the trigger.

Some examples of the method, apparatus, and non-transitory computer-readable medium described above may further include processes, features, means, or instructions for transmitting the uplink transmission at the starting point of the uplink wireless transmission, where the starting point may be in a second partial subframe following the first downlink partial subframe. In some examples of the method, apparatus, and non-transitory computer-readable medium described above, the trigger indicates that the uplink grant includes one or more slot TTIs, one or more two-symbol TTIs, or a combination thereof.

Some examples of the method, apparatus, and non-transitory computer-readable medium described above may further include processes, features, means, or instructions for jointly encoding uplink data across two or more TTIs. Some examples of the method, apparatus, and non-transitory computer-readable medium described above may further include processes, features, means, or instructions for transmitting UCI during one or more of the TTIs.

DETAILED DESCRIPTION

Figure 1:
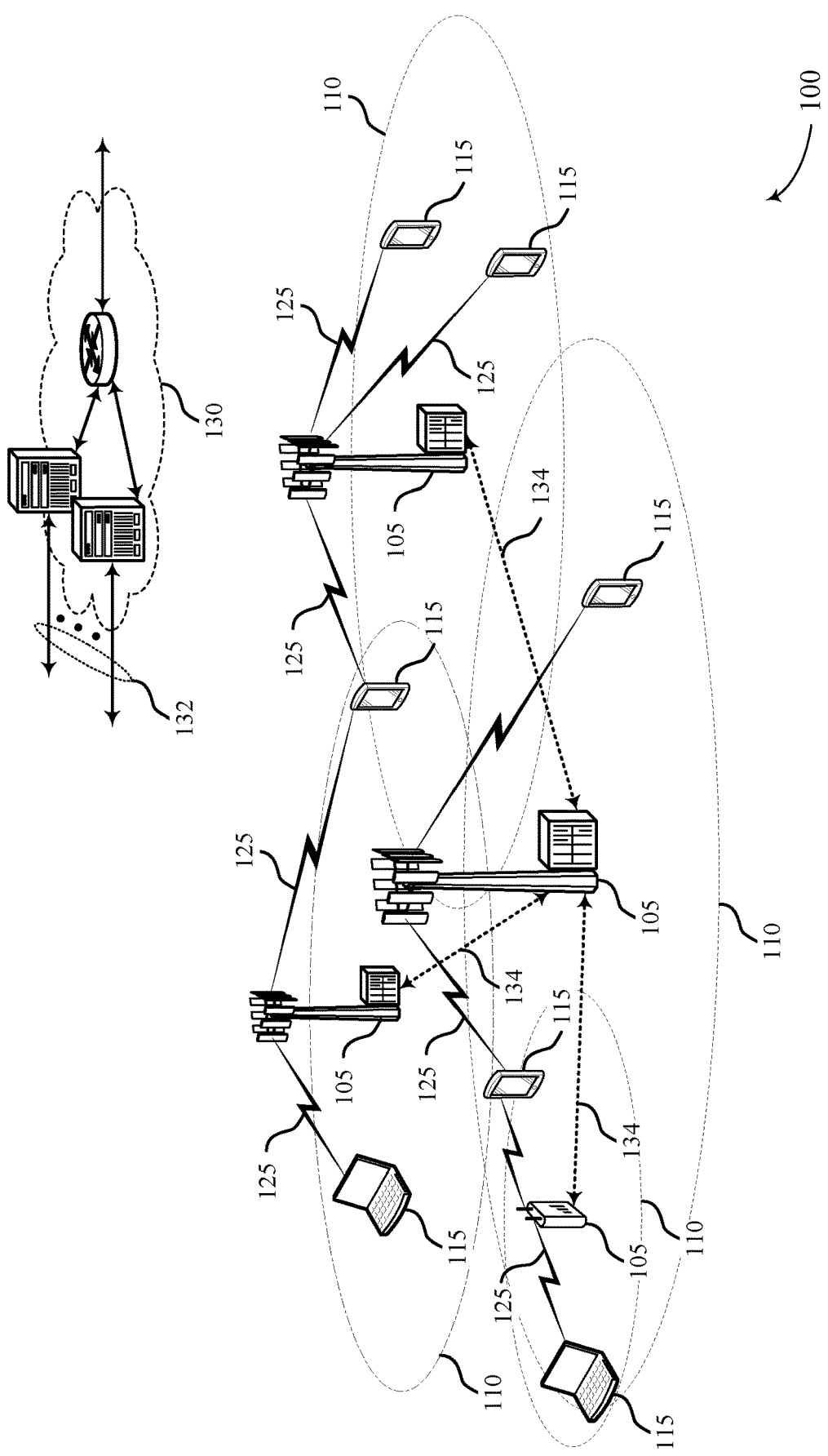
FIG. 1 illustrates an example of a wireless communications system that supports partial subframe transmission techniques in shared radio frequency spectrum in accordance with aspects of the present disclosure.

The described techniques relate to improved methods, systems, devices, or apparatuses that support partial subframe transmission techniques in shared radio frequency spectrum. As indicated above, in some cases, unlicensed radio frequency spectrum bands may be used for Long Term Evolution (LTE), LTE-Advanced (LTE-A), or new radio (NR) communications. Unlicensed radio frequency spectrum may be used in combination with, or independent from, a dedicated or licensed radio frequency spectrum band. The dedicated radio frequency spectrum band may include a radio frequency spectrum band licensed to particular users for particular uses. The unlicensed or shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner and may be accessed through contention-based access procedures. The terms unlicensed radio frequency spectrum and shared radio frequency spectrum are used interchangeably herein.

In some cases, a base station may schedule a user equipment (UE) for downlink and uplink communications through an assignment or grant of resources. However, due to contention-based access, the timing of when a base station or UE has access to shared radio frequency spectrum may not be known until a contention-based access procedure (e.g., a listen-before-talk (LBT) procedure) is completed. Further, in some cases, subframe timing between multiple transmitters that use the shared radio frequency spectrum may be synchronized, and thus time gaps may be present between completion of an LBT procedure and a subsequent start of a subframe. Techniques discussed herein provide for efficient scheduling and transmissions following a successful contention-based access procedure, which may enhance the efficiency of a network that uses shared radio frequency spectrum.

In some cases, a base station may identify a starting location for a transmission and initiate the transmission in a relatively short time period between completion of a successful LBT procedure and transmission of data between the base station and a UE. In the event that an LBT procedure is successfully completed after the start of a subframe, an indication of a transmission may be transmitted at one of a number of predetermined points within the subframe time duration. In some cases, two or more different partial subframe durations may be configured, and one or more different partial subframes may be used for transmissions until the start of a subsequent subframe.

In some cases, a base station may provide an uplink grant to a UE, and the UE may start uplink transmissions based on an established timing between receiving the uplink grant and the start of the uplink transmissions. The uplink grant, in some cases, may be transmitted using a partial subframe, which may allow a UE to start uplink transmissions sooner than uplink transmissions would be started if the uplink grant were transmitted using a full subframe. In some cases, an uplink grant may be provided to a UE, and a separate trigger may be transmitted to initiate the uplink transmission, and the trigger may be transmitted in a partial subframe and may include an indication of a starting or ending position, or both, of the uplink transmission.

Aspects of the disclosure are initially described in the context of a wireless communications system. Aspects of the disclosure are further illustrated by and described with reference to apparatus diagrams, system diagrams, and flowcharts that relate to partial subframe transmission techniques in shared radio frequency spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE, LTE-A, or NR network. In some cases, wireless communications system 100 may support enhanced broadband communications, ultra-reliable (e.g., mission critical) communications, low latency communications, and communications with low-cost and low-complexity devices. Wireless communications system 100 may be an example of a system that supports partial subframe transmissions in shared radio frequency spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may have multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of Ts=1/30,720,000 seconds). Time resources may be organized according to radio frames of length of 10 ms (Tf=307200Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures (such as a clear channel assessment (CCA)) to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

A CCA may include an energy detection or energy sensing procedure to determine whether there are any other active transmissions. For example, each base station 105 or UE 115 may randomly choose a backoff counter (with may be a certain duration or a number of symbols) and listen to a channel including resources that are being contended for until the counter decrements to zero. If the counter reaches zero for a certain base station 105 or UE 115 and no other transmissions are detected, the base station 105 or UE 115 may start transmitting. If the counter does not reach zero before another signal is detected, the device has lost contention for resource and refrains from transmitting.

As indicated above, in some cases base stations 105 and UEs 115 may transmit according to synchronized subframes across devices. However, due to contention-based access, the timing of when a base station 105 or UE 115 has access to shared radio frequency spectrum may not be known until an LBT procedure is completed. In some cases, a base station 105 may identify a starting location for a transmission and initiate the transmission in a relatively short time period between completion of a successful LBT procedure and transmission of data between the base station 105 and a UE 115. In the event that an LBT procedure is successfully completed after the start of a subframe, an indication of a transmission may be transmitted at one of a number of predetermined points (e.g., using a common reference signal such as a CRS transmission, a bandwidth part specific reference transmission, or a DMRS (e.g., a wideband DMRS) transmission) within the subframe time duration. In some cases, two or more different partial subframe durations may be configured, and one or more different partial subframes may be used for transmissions until the start of a subsequent subframe.

In some cases, a base station 105 may provide an uplink grant to a UE 115, and the UE 115 may start uplink transmissions based on an established timing between receiving the uplink grant and the start of the uplink transmissions. The uplink grant, in some cases, may be transmitted using a partial subframe, which may allow a UE 115 to start uplink transmissions sooner than uplink transmissions would be started if the uplink grant were transmitted using a full subframe. In some cases, an uplink grant may be provided to a UE 115, and a separate trigger may be transmitted to initiate the uplink transmission, and the trigger may be transmitted in a partial subframe and may include an indication of a starting or ending position, or both, of the uplink transmission.

Figure 2:
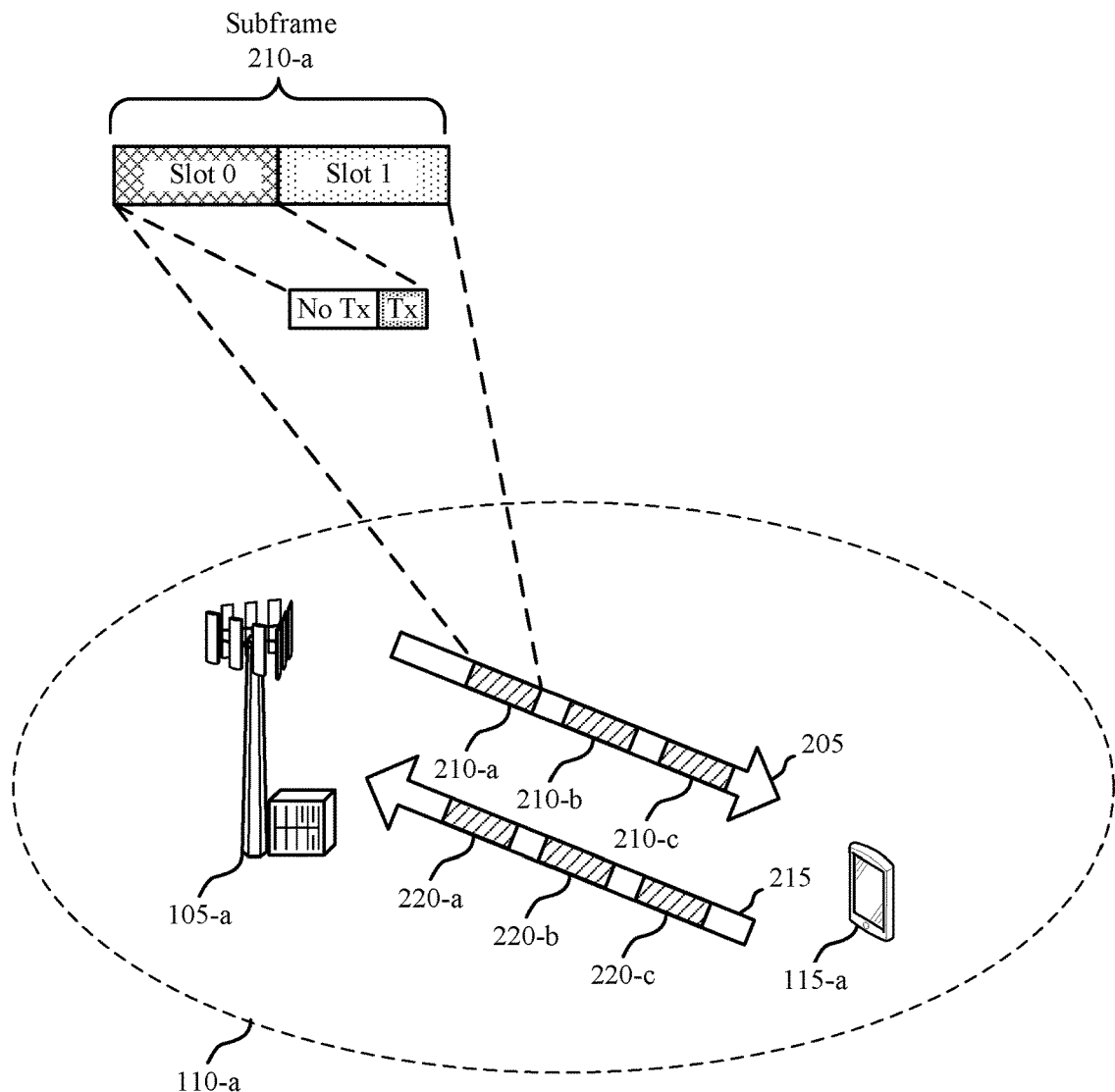
FIG. 2 illustrates an example of a wireless communications system that supports partial subframe transmission techniques in shared radio frequency spectrum in accordance with aspects of the present disclosure.
Figure 2:
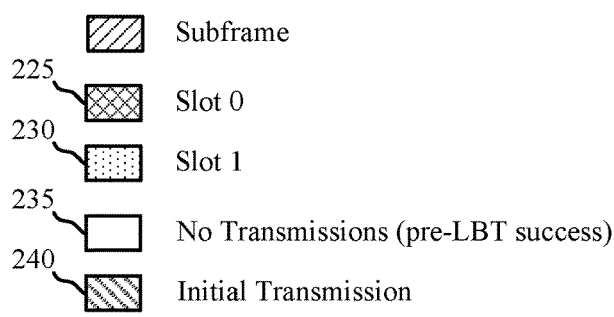

FIG. 2 illustrates an example of a wireless communications system 200 that supports partial subframe transmission techniques in shared radio frequency spectrum in accordance with various aspects of the present disclosure. Wireless communications system 200 includes a base station 105-a and a UE 115-a, which may be examples of aspects of a base station 105 or UE 115 as described above with reference to FIG. 1. In the example of FIG. 2, the wireless communications system 200 may operate according to a radio access technology (RAT) such as an LTE, 5th Generation (5G), or NR RAT, although techniques described herein may be applied to any RAT and to systems that may concurrently use two or more different RATs.

The base station 105-a may communicate with UE 115-a, and one or more other UEs within a coverage area 110-a of the base station 105-a, over a downlink carrier 205 and an uplink carrier 215. In some examples, the base station 105-a may allocate resources for communication with UE 115-a over downlink carrier 205 and uplink carrier 215. For example, base station 105-a may allocate downlink subframes 210 in downlink carrier 205 for downlink transmissions from UE 115-a, and one or more downlink subframes 210 may correspond to a TTI of 1 ms. In this example, downlink subframes 210 may include a first downlink subframe 210-a, a second downlink subframe 210-b, and a third downlink subframe 210-c. Each of the downlink subframes 210 may include two slots, in which each slot may have seven OFDM symbols for a normal cyclic prefix. In this example, a first slot (slot 0) 225 and a second slot (slot 1) 230 may be included in the first subframe 210-a. Similar transmission resources may be allocated in uplink carrier 215 for uplink subframes 220.

As indicated above, in some cases an LBT procedure may result in the base station 105-a gaining channel access between starting points of consecutive downlink subframes 210. In the example of FIG. 2, within the first slot 225, the base station 105-a may complete an LBT procedure and gain channel access, and begin transmissions at some point after the start of the downlink subframe. Thus, within the first slot 225, there may be a period 235 with no transmissions, followed by an initial transmission 240 that begins between consecutive starting locations of consecutive downlink subframes 210. While this example shows the initial transmission 240 starting within the first slot 225, in other examples the initial transmission 240 may start at a starting point of the second slot 230, or after the start of the second slot 230.

In some cases, base station 105-a may configure two or more partial subframe durations to accommodate different starting times of the initial transmission 240. For example, the base station 105-a may configure a first partial subframe duration that corresponds to three OFDM symbols, and a second partial subframe duration that corresponds to a slot duration. Thus, in the event that initial transmission 240 starts within the first slot 225, a first partial subframe may be transmitted with the first partial subframe duration, followed by a transmission of a second partial subframe with the second partial subframe duration, which may then be followed by one or more full subframes having a full subframe duration. In some cases, predefined potential starting points for a partial subframe transmission may be configured by the base station 105-b. In some cases, the potential starting points correspond to OFDM symbols within a subframe that may be used to transmit a CRS (or a bandwidth part specific reference signal). Thus, UE 115-a may monitor for CRS in the configured symbols and, upon detection of CRS, may determine that a partial subframe is being transmitted. Additionally or alternatively, the potential starting points correspond to OFDM symbols within a subframe that contain a DMRS (e.g., a wideband DMRS). Thus, UE 115-a may monitor for DMRS, bandwidth part specific reference signal, and/or CRS in configured symbols and, upon detection of CRS/DMRS/bandwidth part specific reference signal, may determine that a partial subframe is being transmitted.

Figure 3:
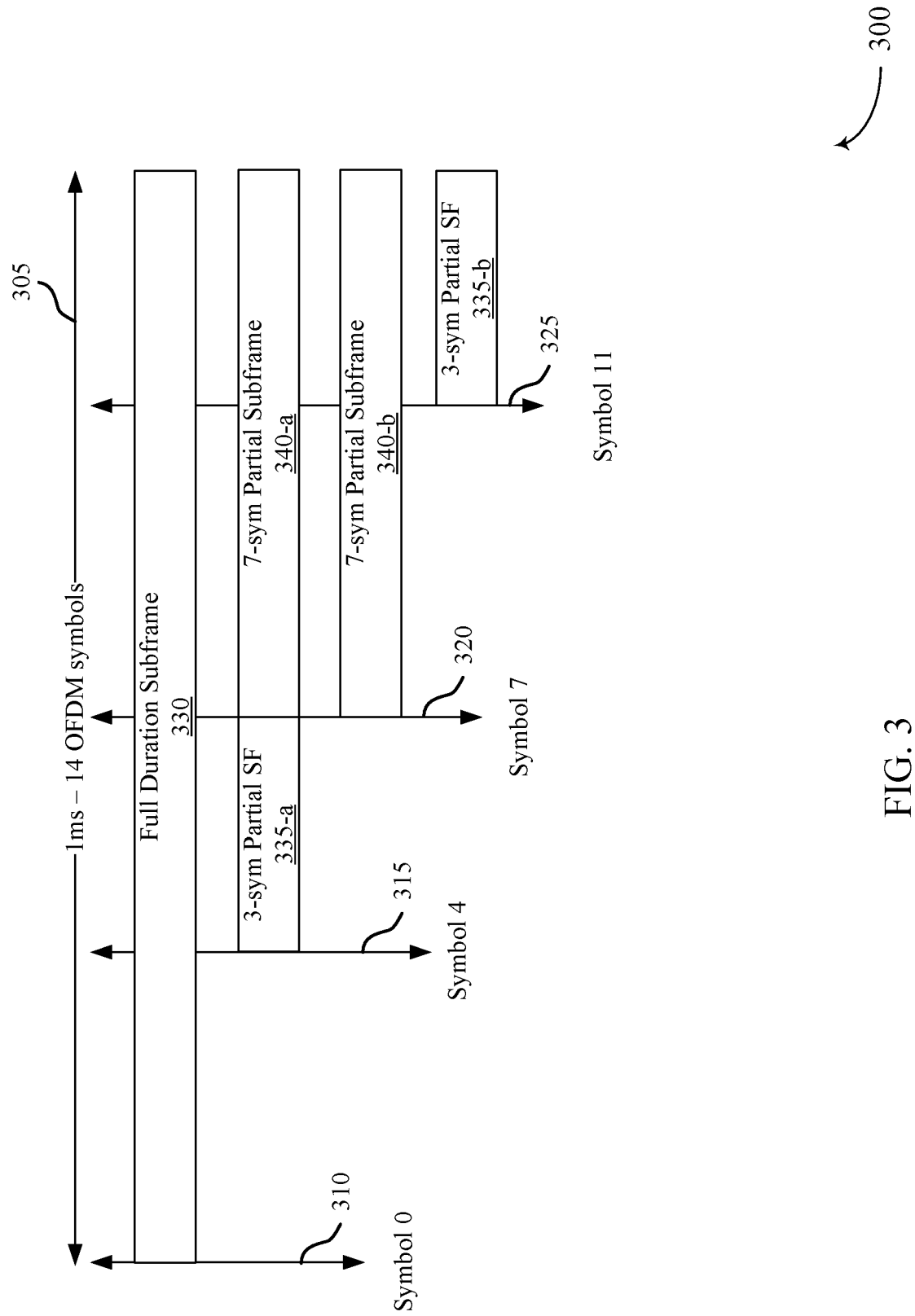
FIG. 3 illustrates an example of downlink resources that support partial subframe transmission techniques in shared radio frequency spectrum in accordance with aspects of the present disclosure.

FIG. 3 illustrates an example of wireless resources 300 that support partial subframe transmission techniques in shared radio frequency spectrum in accordance with various aspects of the present disclosure. The wireless resources 300 may be used for transmissions between a base station and a UE such as in the examples of FIGS. 1 and 2.

In this example, a full subframe duration 305 may correspond to a 1 ms subframe that may include 14 OFDM symbols. Additionally, four potential starting symbols may be provided, which may indicate points at which a transmission may start, and may include symbol-0 310, symbol-4 315, symbol-7 320, and symbol-11 325. In some cases, the potential starting points 310 through 325 correspond to OFDM symbols that are configured for CRS (or bandwidth part specific reference signal) transmission, although other symbols or potential starting points may be selected in other examples. A base station may configure, in this example, two different partial subframe durations that may be used for partial subframe transmissions, in addition to full subframe duration 330 that may be used for transmission of full subframes. In this example, the base station may configure a 3-symbol partial subframe 335 and a 7-symbol partial subframe 340. In some cases, the selection of one or more partial subframes for transmission may be based on a point in time where an LBT procedure is completed and a base station has gained channel access.

For example, if a base station gains channel access after symbol-0 310 and before symbol-4 315, the base station may transmit a 3-symbol partial subframe 335-a that starts at symbol-4 315 and ends at symbol-7 320, followed by a 7-symbol partial subframe 340-a that starts at symbol-7 320 and ends at the end of the full subframe duration 305. If the base station gains channel access after symbol-4 315 and before symbol-7 320, the base station may transmit a 7-symbol partial subframe 340-b that starts at symbol-7 320 and ends at the end of the full subframe duration 305. Likewise, if base station gains channel access after symbol-7 320 and before symbol-11 325, the base station may transmit a 3-symbol partial subframe 335-b that starts at symbol-11 325 and ends at the end of the full subframe duration 305. Thus, the base station may be provided with flexibility in transmitting an initial transmission following an LBT, which may provide for efficient usage of wireless resources.

As indicated above, in some cases the base station may transmit CRS (or bandwidth part specific reference signal) to indicate a starting point of an initial transmission. A UE that is communicating with the base station may UE detects the start of a transmission using CRS port 0 (and port 1). If the UE detects CRS in symbol-0 310, the UE may assume that the transmission is a full duration subframe 330. If the UE does not detect CRS in symbol-0 310, the UE may attempt CRS detection in symbol-4 315, symbol-7 320, and symbol-11 325. If any of the CRS detections are successful, then the UE recognizes the transmission as an initial partial subframe starting in the corresponding symbol, which may be followed by another partial subframe depending upon the symbol in which CRS was detected.

While the example, of FIG. 3 provides for two different partial subframes, in other cases three partial subframes may be configured, in which one partial subframe may be 10 symbols in duration, another may be 7 symbols in duration, and a third would be 3 symbols in duration. Thus, if a UE detects CRS in symbol-4 315 in such an example, the UE may determine that the initial partial subframe has a duration of 10 symbols, and a CRS detection in a later symbol may indicate the corresponding initial partial subframe duration that is a difference between the detected CRS symbol and the end of the full subframe duration 305. In other examples, partial subframes may have other durations.

Figure 4:
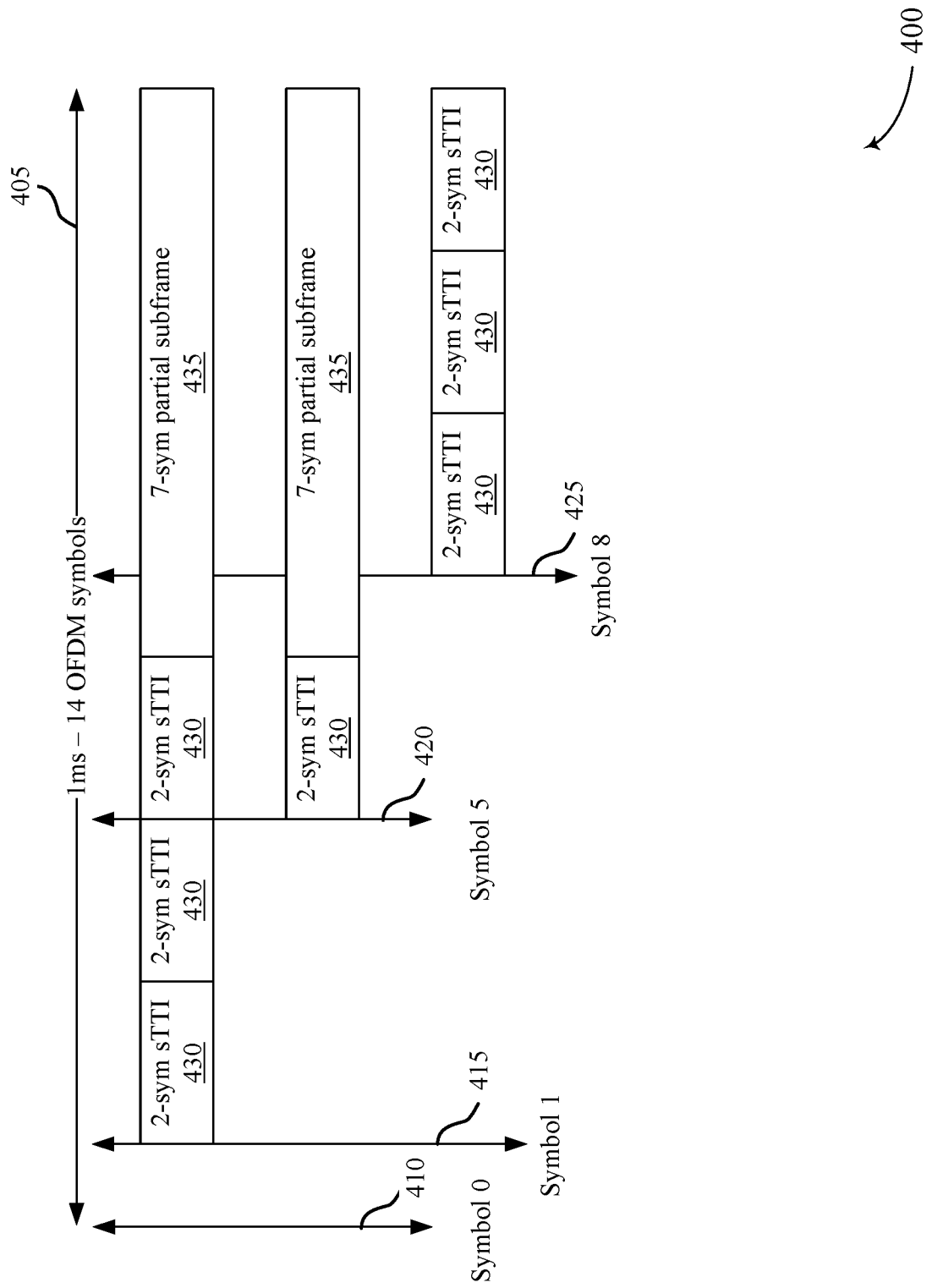
FIG. 4 illustrates another example of downlink resources that support partial subframe transmission techniques in shared radio frequency spectrum in accordance with aspects of the present disclosure.

FIG. 4 illustrates another example of wireless resources 400 that support partial subframe transmission techniques in shared radio frequency spectrum in accordance with various aspects of the present disclosure. The wireless resources 400 may be used for transmissions between a base station and a UE such as in the examples of FIGS. 1 and 2.

In this example, a full subframe duration 405 may again correspond to a 1 ms subframe that may include 14 OFDM symbols. Additionally, four potential starting symbols may be provided, which may indicate points at which a transmission may start, and may include symbol-0 410, symbol-1 415, symbol-5 420, and symbol-8 425. In some cases, the potential starting points 410 through 425 correspond to OFDM symbols that are configured for DMRS transmission, although other symbols or potential starting points may be selected in other examples. A base station may configure, in this example, two different partial subframe durations that may be used for partial subframe transmissions, in addition to full subframe duration that may be used for transmission of full subframes. In this example, the base station may configure a 2-symbol partial subframe 430 and a 7-symbol partial subframe 435. In some cases, the selection of one or more partial subframes for transmission may be based on a point in time where an LBT procedure is completed and a base station has gained channel access.

For example, if a base station gains channel access after symbol-0 410 and before symbol-1 415, the base station may transmit a three 2-symbol partial subframes 430 followed by a 7-symbol partial subframe 440-a that starts at symbol-7 (corresponding to one slot) and ends at the end of the full subframe duration 405. If the base station gains channel access after symbol-3 and before symbol-5 420, the base station may transmit a 2-symbol partial subframe 430 and ends at symbol-7 followed by a 7-symbol partial subframe 435 that ends at the end of the full subframe duration 405. Likewise, if base station gains channel access after symbol-7 and before symbol-8 425, the base station may transmit a three 2-symbol partial subframes 430 to occupy available time resources until the end of the full subframe duration 405. Thus, the base station may be provided with flexibility in transmitting an initial transmission following an LBT, which may provide for efficient usage of wireless resources.

Such a 2-symbol partial subframe 430 may provide that, based on the OFDM symbol in which the base station obtains channel access, the rest of the subframe is divided into multiple sTTI intervals. In some cases, each shortened physical downlink shared channel (sPDSCH) within the sTTI may be scheduled individually and independently of the other sTTIs, and in some cases each sTTI could address different UEs or sets of users. While only three potential starting points after symbol-0 410 are illustrated in FIG. 4, other potential starting points may be used in such cases, and in some examples 2-symbol partial subframes 430 may start in any of symbols 1, 3, 5, 8, 10 or 12. Furthermore, a 7-symbol partial subframe 435 may in symbol-7 and may be used in some cases.

In some examples, a UE may perform a base station transmission detection based on DMRS transmitted for demodulation of 2-symbol partial subframes 430. In some cases, once the UE detects a partial subframe transmission, the UE can determine the partial subframe configuration for the remainder of full subframe duration 405 based on a frame structure configuration which may provide, for example that all remaining time resources are divided into 2-symbol partial subframe 430 durations, or that only time resources prior to symbol-7 are divided into 2-symbol partial subframe 430 durations with a 7-symbol partial subframe 435 transmitted starting at symbol-7.

Figure 5:
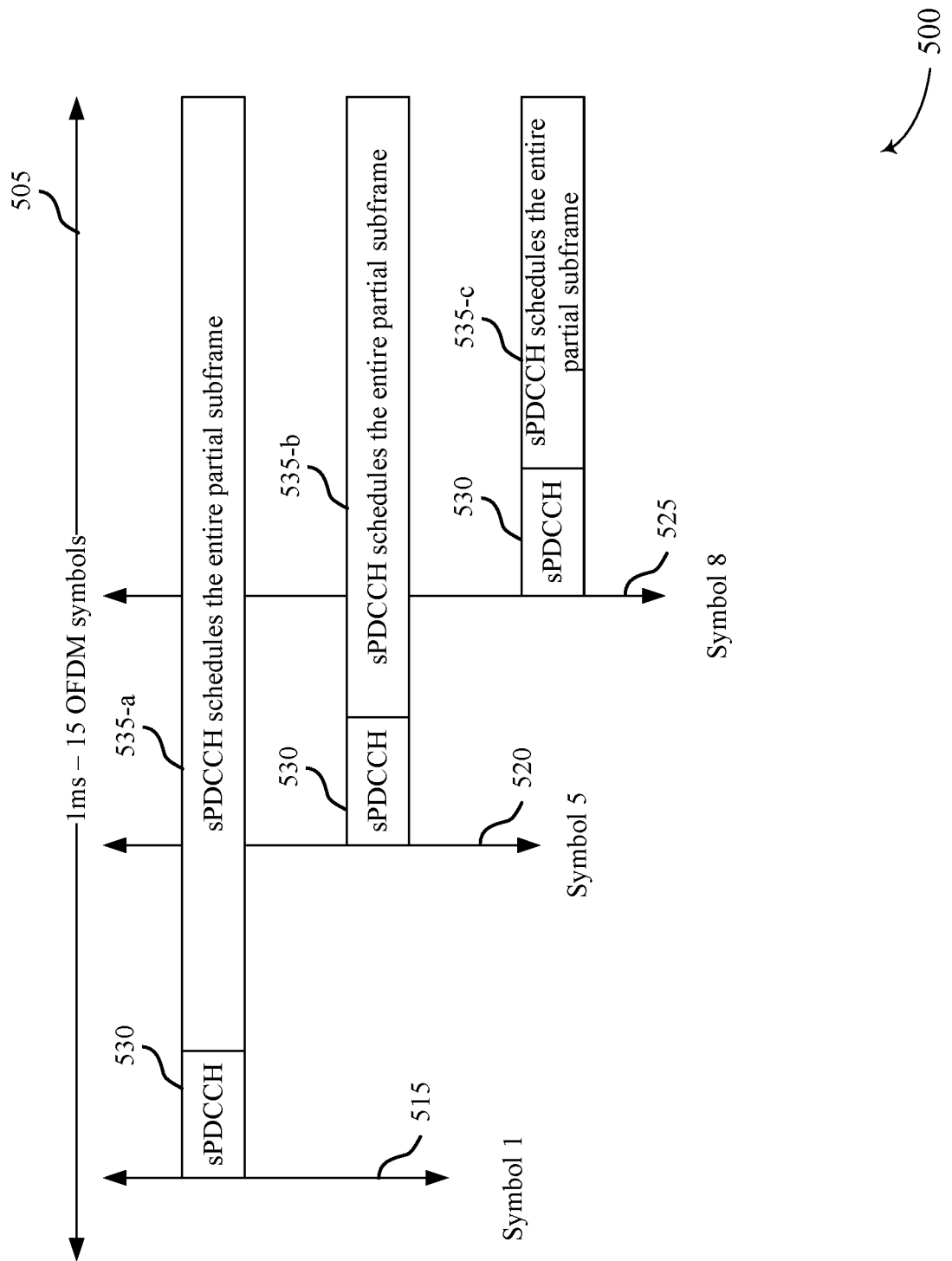
FIG. 5 illustrates another example of downlink resources that support partial subframe transmission techniques in shared radio frequency spectrum in accordance with aspects of the present disclosure.

FIG. 5 illustrates another example of wireless resources 500 that support partial subframe transmission techniques in shared radio frequency spectrum in accordance with various aspects of the present disclosure. The wireless resources 500 may be used for transmissions between a base station and a UE such as in the examples of FIGS. 1 and 2.

In this example, a full subframe duration 505 may again correspond to a 1 ms subframe that may include 14 OFDM symbols. A base station, in this example, transmit a sPDCCH 530 transmission following a successful LBT procedure, and FIG. 5 shows three examples that start at symbol-1 515, symbol-5 520, and symbol-8 525. Other starting points may be used in other examples, with the example of FIG. 5 provided for purposes of illustration and discussion. The sPDCCH transmission 530 may schedule a partial subframe 535 that occupies the remaining portion of the entire partial subframe. In some examples, a UE may detect a sTTI DMRS and DCI may be provided that schedules the partial subframe 525. In some examples, a UE may perform transmission detection based on the DMRS in the sTTI. As in the example of FIG. 4, the sTTI, or 2-symbol partial subframe, may start in symbols 1, 3, 5, 8, 10, and/or 12. In some examples, for starting in symbol-7, a 7-symbol partial subframe may be used. In some cases, the DCI transmitted on sPDCCH 530 may allocate the entire initial partial subframe (in time) to a single UE.

While the examples of FIGS. 3-5 provide various potential starting locations for a partial subframe, other examples may provide different ending partial subframe candidates. In some examples, end positions can be enabled in symbols 4, 5, 6, 7, 8, 13, etc., to make the system more efficient. Either new end partial configurations may be defined (including CRS, bandwidth part specific reference signal, DMRS patterns) or the end partial subframe may be scheduled fully using control channel transmissions, or a combination of both approaches may be used in some examples.

In some examples, TBS for transmissions using partial subframes may be scaled in some instances. For example, if a partial subframe has a starting symbol in the first slot, TBS scaling may not be used, and TBS may be selected and used according to established TBS techniques. In the event that a partial subframe starts in a symbol in the second slot, TBS scaling may be selected to reduce a TBS for the transmissions. For example, a TBS factor of 0.375 may be applied to partial subframe transmissions that start in the second slot.

Figure 6:
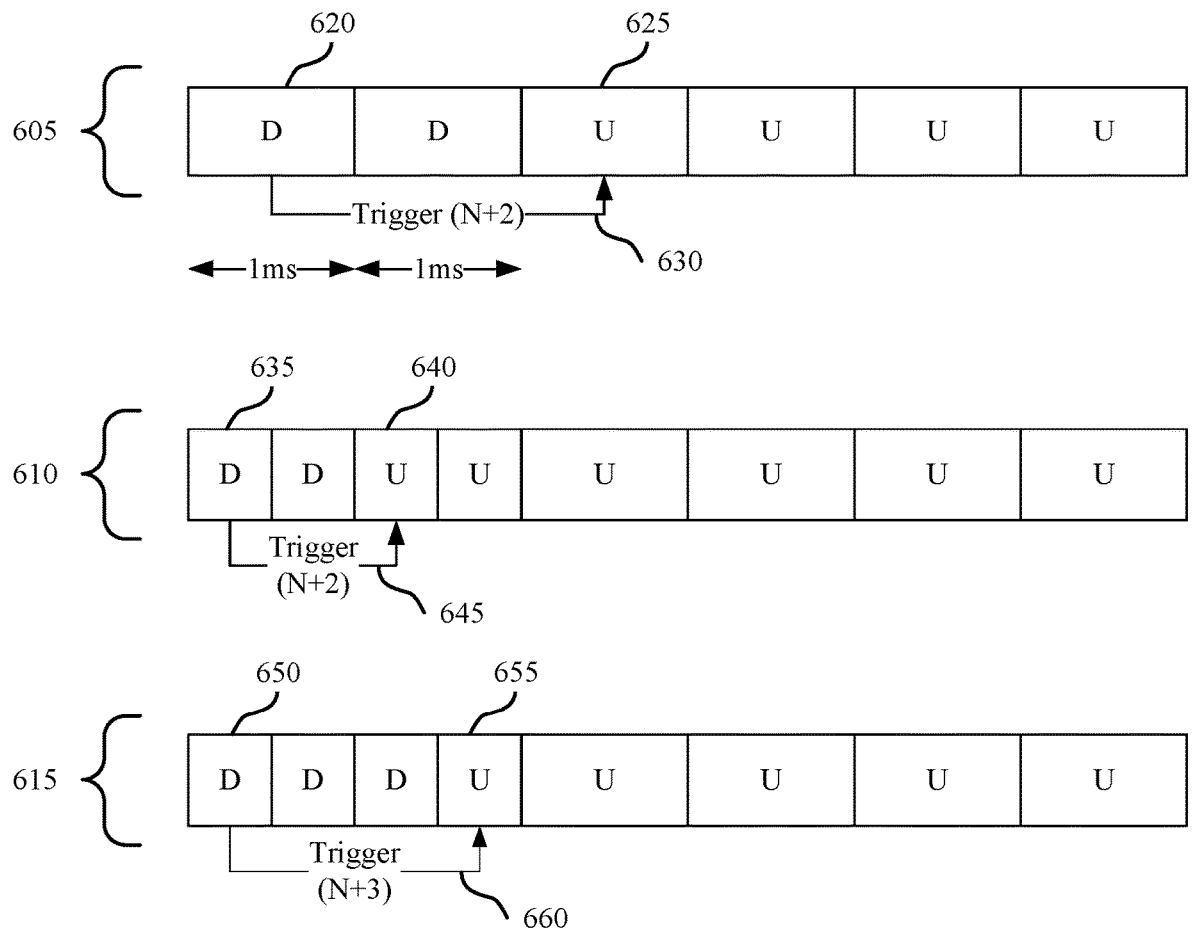
FIG. 6 illustrates an example of uplink resources that support partial subframe transmission techniques in shared radio frequency spectrum in accordance with aspects of the present disclosure.

FIG. 6 illustrates an example of uplink wireless resources 600 that support partial subframe transmission techniques in shared radio frequency spectrum in accordance with various aspects of the present disclosure. The wireless resources 600 may be used for transmissions between a base station and a UE such as in the examples of FIGS. 1 and 2.

In this example, a first set of resources 605 may include only full duration subframe resources, a second set of resources 610 may include both partial subframe resource and full duration subframe resources, and a third set of resources 615 may include both partial subframe resource and full duration subframe resources. By providing partial subframes in sets of resources 610-615, timing for starting an uplink transmission may be shortened, and uplink resources may be more fully utilized through one or more partial subframes. In some cases, a base station may provide a UE with an uplink grant, which the UE may use to make one or more uplink transmissions. In some cases, an uplink grant may be provided as a two stage grant that spans multiple transmission opportunities (TxOPs). An initial grant may provide information that spans the multiple TxOPs, and actual uplink transmissions may be triggered in a second stage grant, with the trigger being provided in cases where channel access has been obtained through an LBT procedure. In some cases, an uplink transmission may start at a TTI that has an N+2 relationship with the trigger TTI.

In the resources 605, for example, a trigger 630 may be provided in a first downlink subframe 620, and an uplink transmission may be transmitted in uplink subframe 625 that is N+2 subframes following the downlink subframe 620. Thus, in this example, a delay of at least 2 ms may be present between an uplink trigger 630 and an uplink transmission 625. In resources 610, an uplink trigger 645 may be provided using a downlink partial subframe 635, with a corresponding uplink transmission initiated in uplink partial subframe 640. In cases where the partial subframes correspond to a slot duration, the uplink transmission 640 may start 1 ms following the trigger 645. In some cases, a UE may need more than 1 ms to prepare and transmit an uplink transmission, such as due to processing of uplink transmissions, for example. In resources 615, partial subframes may be configured with a trigger 660 provided in a first downlink partial subframe 650 that triggers an uplink transmission 655 that has an N+3 relationship to the trigger partial subframe 650. In cases where the partial subframes have a slot duration, the uplink transmission may start in uplink partial subframe 655 that starts 1.5 ms after the downlink partial subframe 650. Thus, partial subframes may reduce the overhead of uplink scheduling. In some cases, an uplink grant may indicate a start symbol of an uplink transmission (e.g., an initial partial subframe) or an end position of the uplink transmission (e.g., an end partial subframe). In some examples, one or more bits in a trigger message 645 or 660 may indicate the start position of an uplink transmission (e.g., an initial partial subframe) or an end position of an uplink transmission (e.g., an end partial subframe).

Figure 7:
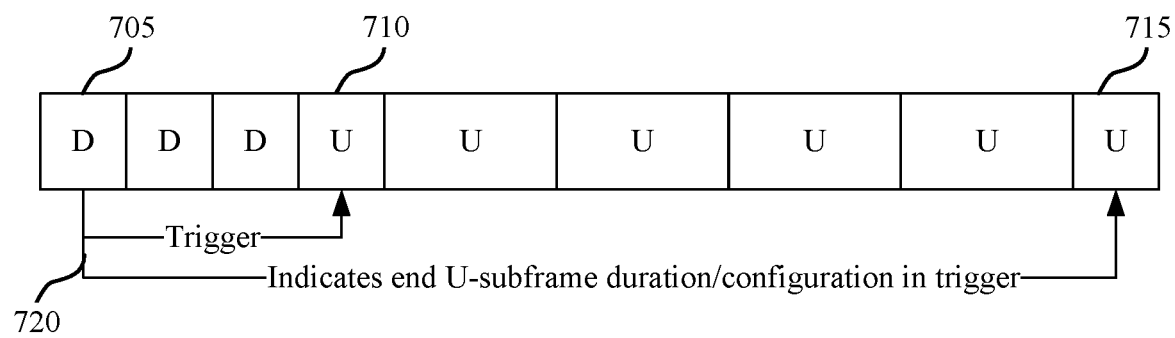
FIG. 7 illustrates another example of uplink resources that support partial subframe transmission techniques in shared radio frequency spectrum in accordance with aspects of the present disclosure.

FIG. 7 illustrates another example of uplink wireless resources 700 that support partial subframe transmission techniques in shared radio frequency spectrum in accordance with various aspects of the present disclosure. The wireless resources 600 may be used for transmissions between a base station and a UE such as in the examples of FIGS. 1 and 2.

In this example, wireless resources 700 may include both partial subframe resources and full duration subframe resources. In this example, both a start uplink subframe 710 and an end uplink subframe 715 may be indicated in a trigger 720 that may be transmitted in a downlink partial subframe 705. In this example, the configuration of the uplink end partial subframe 715 may be based on a number of available uplink symbols, and may be indicated in the trigger 720. For example, if a number of available uplink symbols is 9, the uplink transmission may have a structure of a 7-symbol partials subframe plus a 2 symbol partial subframe. In another example, if a number of available uplink symbols is 6 symbols, the uplink transmission may have a structure of a 4-symbol partial subframe and a 2-symbol partial subframe. Using such techniques, uplink transmissions may fit the partial subframe or sTTI configurations available. In some cases, a UE may use joint encoding of data over all the partial subframes or sTTIs in a partial subframe.

Additionally, in some cases, UCI may be transmitted in the uplink transmissions. In some examples, UCI may be mapped to be provided only in the largest sTTI or partial subframe, or may be mapped to be split equally around a subset or around all partial subframes or sTTIs. In some examples, acknowledgment and negative acknowledgment (ACK/NACK) feedback may be provided as part of UCI, and may be mapped to uplink symbols before and after DMRS. Additionally, in some cases, rank indicator (RI) information may be mapped to the symbols two symbols away from the DMRS. In some cases, if the UCI mapped symbol is not available in an end partial subframe, then the UCI (e.g., ACK/NACK and/or RI) is not mapped in that slot (and uses only the first slot).

In some cases, an uplink partial subframe can be defined to end at every possible symbol in a subframe. Possible candidates for the end partial subframe may thus be configured in some examples. In some examples, uplink end partial subframes may be defined with 1 or 2 symbol granularities. On other cases, uplink grants that schedule uplink transmissions within a TxOP may schedule uplink end partial subframes.

In some cases, a full uplink subframe may be truncated by removing a number of symbols from the end partial subframe, which may allow for defining partial subframes even with a 1 symbol granularity. In such cases, uplink shared channel (e.g., PUSCH) rate matching may be provided based on a time first, frequency second rate matching behavior, as the UE is aware of the end partial subframe configuration.

Figure 8:
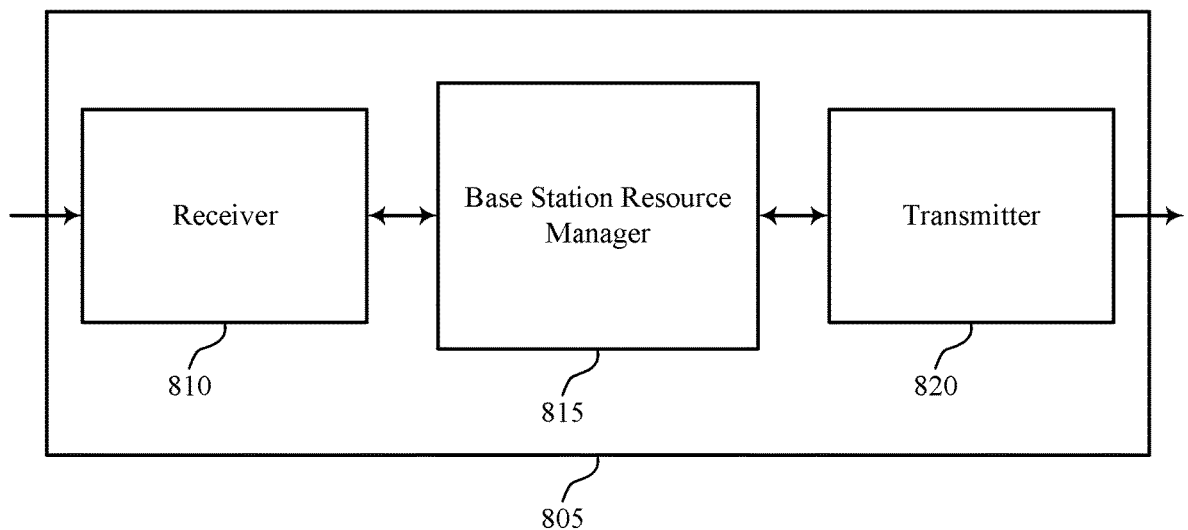
FIGS. 8 through 10 show block diagrams of a device that supports partial subframe transmission techniques in shared radio frequency spectrum in accordance with aspects of the present disclosure.

FIG. 8 shows a block diagram 800 of a wireless device 805 that supports partial subframe transmission techniques in shared radio frequency spectrum in accordance with aspects of the present disclosure. Wireless device 805 may be an example of aspects of a base station 105 as described with reference to FIG. 1. Wireless device 805 may include receiver 810, base station resource manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to partial subframe transmission techniques in shared radio frequency spectrum). Information may be passed on to other components of the device. The receiver 810 may be an example of aspects of the transceiver 1135 described with reference to FIG. 11. The receiver 810 may utilize a single antenna or a set of antennas.

Receiver 810 may receive the uplink transmission, where the starting point of the uplink wireless transmission is in a second partial subframe following the downlink partial subframe.

Base station resource manager 815 may be an example of aspects of the base station resource manager 1115 described with reference to FIG. 11. Base station resource manager 815 and/or at least some of its various sub-components may be implemented in hardware, software executed by a processor, firmware, or any combination thereof. If implemented in software executed by a processor, the functions of the base station resource manager 815 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure.

The base station resource manager 815 and/or at least some of its various sub-components may be physically located at various positions, including being distributed such that portions of functions are implemented at different physical locations by one or more physical devices. In some examples, base station resource manager 815 and/or at least some of its various sub-components may be a separate and distinct component in accordance with various aspects of the present disclosure. In other examples, base station resource manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station resource manager 815 may identify a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum. Base station resource manager 815 may perform an LBT procedure to gain access to the shared radio frequency spectrum and determine that a starting position of a first transmission is within the first full subframe duration based on the LBT procedure. Base station resource manager 815 may transmit, based on a location of the starting position within the first full subframe duration, the first transmission using a first partial subframe having the first partial subframe duration, a second partial subframe having the second partial subframe duration, or both the first partial subframe and the second partial subframe.

The base station resource manager 815 may also identify a full subframe duration for use in wireless transmissions using shared radio frequency spectrum, a starting point of the full subframe duration being synchronized among two or more transmitters using the shared radio frequency spectrum and perform an LBT procedure to gain access to the shared radio frequency spectrum. Base station resource manager 815 may determine that a starting position of a first transmission is within the first full subframe duration based on the LBT procedure and configure a partial subframe for the first transmission having a partial subframe duration based on a difference between the starting position within the first full subframe duration and the full subframe duration. Base station resource manager 815 may transmit an indication of the partial subframe duration in a control channel transmission associated with the first transmission.

The base station resource manager 815 may also transmit an uplink grant for uplink data that is to be transmitted in an uplink wireless transmission using a shared radio frequency spectrum band and configure two or more partial subframes within a full subframe duration for use in wireless transmissions using the shared radio frequency spectrum band, at least one of the two or more partial subframes configured as a downlink partial subframe. Base station resource manager 815 may transmit a trigger for the uplink grant in the downlink partial subframe, the trigger indicating one or more of a starting point of the uplink wireless transmission or an ending point of the uplink wireless transmission.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
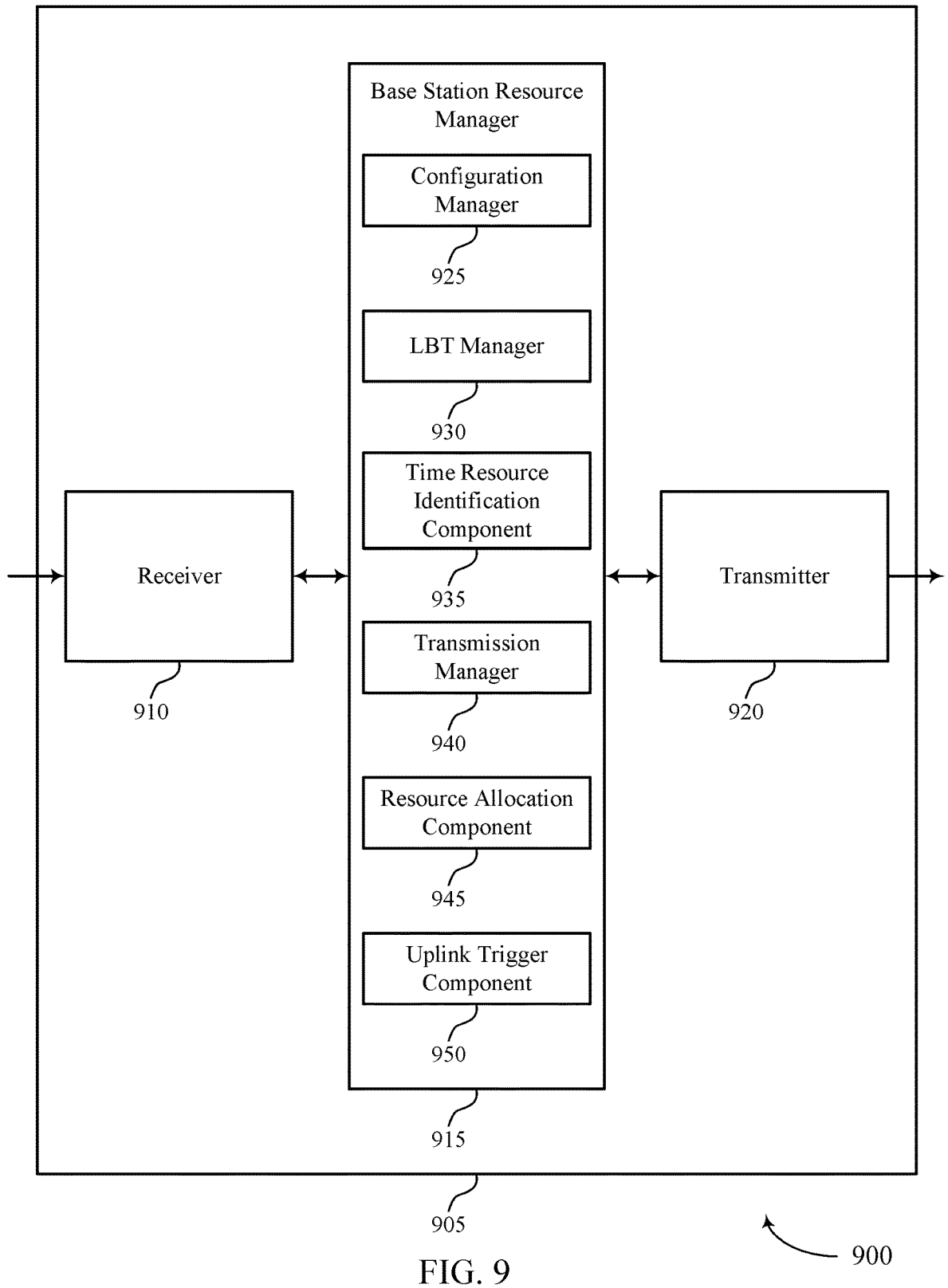

FIG. 9 shows a block diagram 900 of a wireless device 905 that supports partial subframe transmission techniques in shared radio frequency spectrum in accordance with aspects of the present disclosure. Wireless device 905 may be an example of aspects of a wireless device 805 or a base station 105 as described with reference to FIGS. 1 and 8. Wireless device 905 may include receiver 910, base station resource manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to partial subframe transmission techniques in shared radio frequency spectrum, etc.). Information may be passed on to other components of the device. The receiver 910 may be an example of aspects of the transceiver 1135 described with reference to FIG. 11. The receiver 910 may utilize a single antenna or a set of antennas.

Base station resource manager 915 may be an example of aspects of the base station resource manager 1115 described with reference to FIG. 11. Base station resource manager 915 may also include configuration manager 925, LBT manager 930, time resource identification component 935, transmission manager 940, resource allocation component 945, and uplink trigger component 950.

Configuration manager 925 may identify a full subframe duration for use in wireless transmissions using shared radio frequency spectrum, a first partial subframe duration that is shorter than the full subframe duration, and a second partial subframe duration that is shorter than the first partial subframe duration. A starting point of the full subframe duration may be synchronized among two or more transmitters using shared radio frequency spectrum, as discussed above. In some cases, configuration manager 925 may transmit configuration information to a UE that indicates the first partial subframe duration and the second partial subframe duration. In some examples, configuration manager 925 may configure two or more partial subframes within a full subframe duration for use in wireless transmissions using the shared radio frequency spectrum band, at least one of the two or more partial subframes configured as a downlink partial subframe, and configure an ending subframe of an uplink grant to be a partial subframe. In some instances, the second partial subframe duration corresponds to at least two (e.g., two or three) OFDM symbols. In some cases, the configuration information further indicates the second partial subframe may be transmitted at an end of the first full subframe duration. In some examples, the indication of the partial subframe duration includes DCI that indicates the partial subframe duration.

LBT manager 930 may perform an LBT procedure to gain access to the shared radio frequency spectrum. In some cases, the LBT procedure is a CCA procedure.

Time resource identification component 935 may determine that a starting position of a transmission is within a full subframe duration based on an LBT procedure. In some cases, time resource identification component 935 may determine a total duration of an uplink grant, and provide a trigger that indicates the starting point and the total duration of the uplink grant. In some examples, time resource identification component 935 may determine a starting point for a downlink transmission. In some aspects, the starting point corresponds to symbols 0, 4, 7, and 11 of the full subframe duration. In some instances, the determining includes determining that a difference between the starting position of the first transmission and an end of the full subframe duration is less than the first partial subframe duration, and the first transmission uses the second partial subframe.

In some cases, the determining includes determining that the starting position corresponds to symbol 11 of the full subframe duration, and the first transmission uses a second partial subframe which corresponds to 3 symbols of the full subframe duration. In some examples, the determining includes determining that the starting position corresponds to symbol 7 of the full subframe duration, and the first transmission uses the first partial subframe which corresponds to a slot of the full subframe duration. In some aspects, the determining includes determining that the starting position of the first transmission corresponds to a start of a slot within the full subframe duration, and the first partial subframe duration corresponds to a duration of the slot. In some instances, the determining includes determining that the starting position corresponds to symbol 4 of the full subframe duration, and the first transmission uses the second partial subframe which corresponds to 3 symbols and the first partial subframe which corresponds to a slot of the full subframe duration. In some cases, the starting location corresponds to symbol 1, 3, 5, 8, 10, or 12 of the full subframe duration. In some examples, the partial subframe duration corresponds to a number of OFDM symbols between the indication and an end of the full subframe duration. In some cases, the partial subframe duration corresponds to an integer number of two-OFDM-symbol TTIs.

Transmission manager 940 may transmit, based on a location of the starting position within the first full subframe duration, the first transmission using a first partial subframe having the first partial subframe duration, a second partial subframe having the second partial subframe duration, or both the first partial subframe and the second partial subframe, and transmit an indication of the partial subframe duration in a control channel transmission associated with the first transmission.

Resource allocation component 945 may configure a partial subframe for the first transmission having a partial subframe duration based on a difference between the starting position within the first full subframe duration and the full subframe duration. In some cases, resource allocation component 945 may transmit an uplink grant for uplink data that is to be transmitted in an uplink wireless transmission using a shared radio frequency spectrum band. In some examples, a partial subframe spans an entire duration between the starting position and an end of the full subframe duration and is scheduled in a single sPDCCH transmission.

Uplink trigger component 950 may transmit a trigger for the uplink grant in the downlink partial subframe, the trigger indicating one or more of a starting point of the uplink wireless transmission or an ending point of the uplink wireless transmission. In some cases, the trigger indicates that the uplink grant includes one or more slot TTIs, one or more two-symbol TTIs, or a combination thereof.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
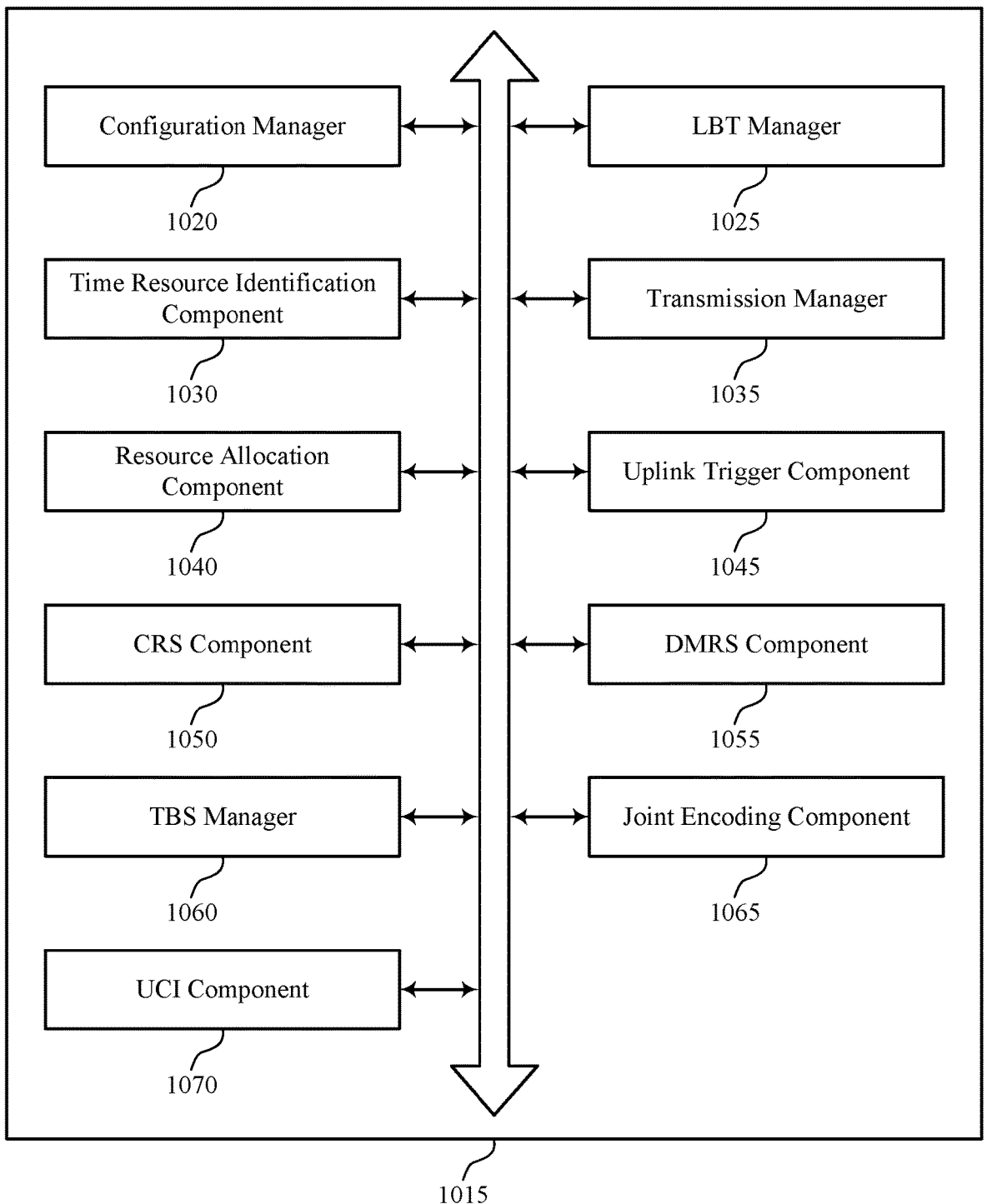

FIG. 10 shows a block diagram 1000 of a base station resource manager 1015 that supports partial subframe transmission techniques in shared radio frequency spectrum in accordance with aspects of the present disclosure. The base station resource manager 1015 may be an example of aspects of a base station resource manager 815, a base station resource manager 915, or a base station resource manager 1115 described with reference to FIGS. 8, 9, and 11. The base station resource manager 1015 may include configuration manager 1020, LBT manager 1025, time resource identification component 1030, transmission manager 1035, resource allocation component 1040, uplink trigger component 1045, CRS component 1050, DMRS component 1055, TBS manager 1060, joint encoding component 1065, and UCI component 1070. Each of these modules may communicate, directly or indirectly, with one another (e.g., via one or more buses).

Configuration manager 1020 may identify a full subframe duration for use in wireless transmissions using shared radio frequency spectrum, a first partial subframe duration that is shorter than the full subframe duration, and a second partial subframe duration that is shorter than the first partial subframe duration. A starting point of the full subframe duration may be synchronized among two or more transmitters using shared radio frequency spectrum, as discussed above. In some cases, configuration manager 1020 may transmit configuration information to a UE that indicates the first partial subframe duration and the second partial subframe duration. In some examples, configuration manager 1020 may configure two or more partial subframes within a full subframe duration for use in wireless transmissions using the shared radio frequency spectrum band, at least one of the two or more partial subframes configured as a downlink partial subframe, and configure an ending subframe of an uplink grant to be a partial subframe. In some aspects, the second partial subframe duration corresponds to at least two (e.g., two or three) OFDM symbols. In some instances, the second partial subframe duration corresponds to two OFDM symbols. In some cases, the configuration information further indicates the second partial subframe may be transmitted at an end of the first full subframe duration. In some examples, the indication of the partial subframe duration includes DCI that indicates the partial subframe duration.

LBT manager 1025 may perform an LBT procedure to gain access to the shared radio frequency spectrum. In some cases, the LBT procedure is a CCA procedure.

Time resource identification component 1030 may determine that a starting position of a transmission is within a full subframe duration based on an LBT procedure. In some cases, time resource identification component 1030 may determine a total duration of an uplink grant, and provide a trigger that indicates the starting point and the total duration of the uplink grant. In some cases, time resource identification component 1030 may determine a starting point for a downlink transmission. In some examples, the starting point corresponds to symbols 0, 4, 7, and 11 of the full subframe duration. In some aspects, the determining includes determining that a difference between the starting position of the first transmission and an end of the full subframe duration is less than the first partial subframe duration, and the first transmission uses the second partial subframe.

In some cases, the determining includes determining that the starting position corresponds to symbol 11 of the full subframe duration, and the first transmission uses a second partial subframe which corresponds to 3 symbols of the full subframe duration. In some examples, the determining includes determining that the starting position corresponds to symbol 7 of the full subframe duration, and the first transmission uses the first partial subframe which corresponds to a slot of the full subframe duration. In some aspects, the determining includes determining that the starting position of the first transmission corresponds to a start of a slot within the full subframe duration, and the first partial subframe duration corresponds to a duration of the slot. In some instances, the determining includes determining that the starting position corresponds to symbol 4 of the full subframe duration, and the first transmission uses the second partial subframe which corresponds to 3 symbols and the first partial subframe which corresponds to a slot of the full subframe duration. In some cases, the starting location corresponds to symbol 1, 3, 5, 8, 10, or 12 of the full subframe duration. In some examples, the partial subframe duration corresponds to a number of OFDM symbols between the indication and an end of the full subframe duration. In some aspects, the partial subframe duration corresponds to an integer number of two-OFDM-symbol TTIs.

Transmission manager 1035 may transmit, based on a location of the starting position within the first full subframe duration, the first transmission using a first partial subframe having the first partial subframe duration, a second partial subframe having the second partial subframe duration, or both the first partial subframe and the second partial subframe, and transmit an indication of the partial subframe duration in a control channel transmission associated with the first transmission.

Resource allocation component 1040 may configure a partial subframe for the first transmission having a partial subframe duration based on a difference between the starting position within the first full subframe duration and the full subframe duration. In some cases, resource allocation component 1040 may transmit an uplink grant for uplink data that is to be transmitted in an uplink wireless transmission using a shared radio frequency spectrum band. In some examples, a partial subframe spans an entire duration between the starting position and an end of the full subframe duration and is scheduled in a single sPDCCH transmission.

Uplink trigger component 1045 may transmit a trigger for the uplink grant in the downlink partial subframe, the trigger indicating one or more of a starting point of the uplink wireless transmission or an ending point of the uplink wireless transmission. In some cases, the trigger indicates that the uplink grant includes one or more slot TTIs, one or more two-symbol TTIs, or a combination thereof.

CRS component 1050 may transmit a CRS (or bandwidth part specific reference signal) in an initial OFDM symbol of the first transmission to indicate the starting location. DMRS component 1055 may transmit a DMRS (e.g., a wideband DMRS) in an initial OFDM symbol of the first transmission to indicate the starting location. TBS manager 1060 may scale a transport block size based on the starting position. Joint encoding component 1065 may jointly encode data transmitted in the uplink wireless transmission across two or more TTIs. UCI component 1070 may configure UCI to be transmitted during one or more of the TTIs.

Figure 11:
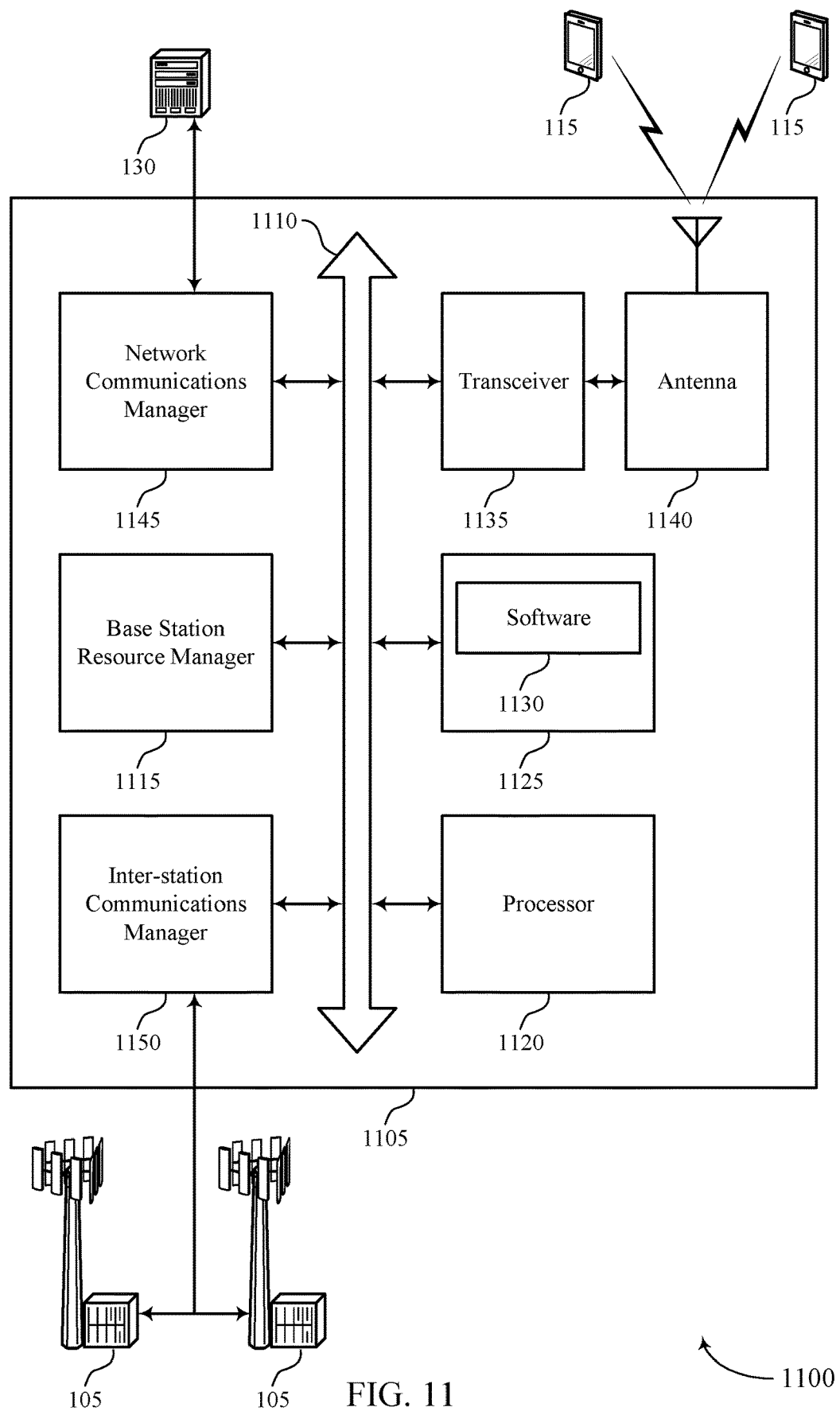
FIG. 11 illustrates a block diagram of a system including a base station that supports partial subframe transmission techniques in shared radio frequency spectrum in accordance with aspects of the present disclosure.

FIG. 11 shows a diagram of a system 1100 including a device 1105 that supports partial subframe transmission techniques in shared radio frequency spectrum in accordance with aspects of the present disclosure. Device 1105 may be an example of or include the components of wireless device 805, wireless device 905, or a base station 105 as described above, e.g., with reference to FIGS. 1, 8 and 9. Device 1105 may include components for bi-directional voice and data communications including components for transmitting and receiving communications, including base station resource manager 1115, processor 1120, memory 1125, software 1130, transceiver 1135, antenna 1140, network communications manager 1145, and inter-station communications manager 1150. These components may be in electronic communication via one or more busses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting partial subframe transmission techniques in shared radio frequency spectrum).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support partial subframe transmission techniques in shared radio frequency spectrum. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A wireless communication network technology to provide communication between base stations 105.

Figure 12:
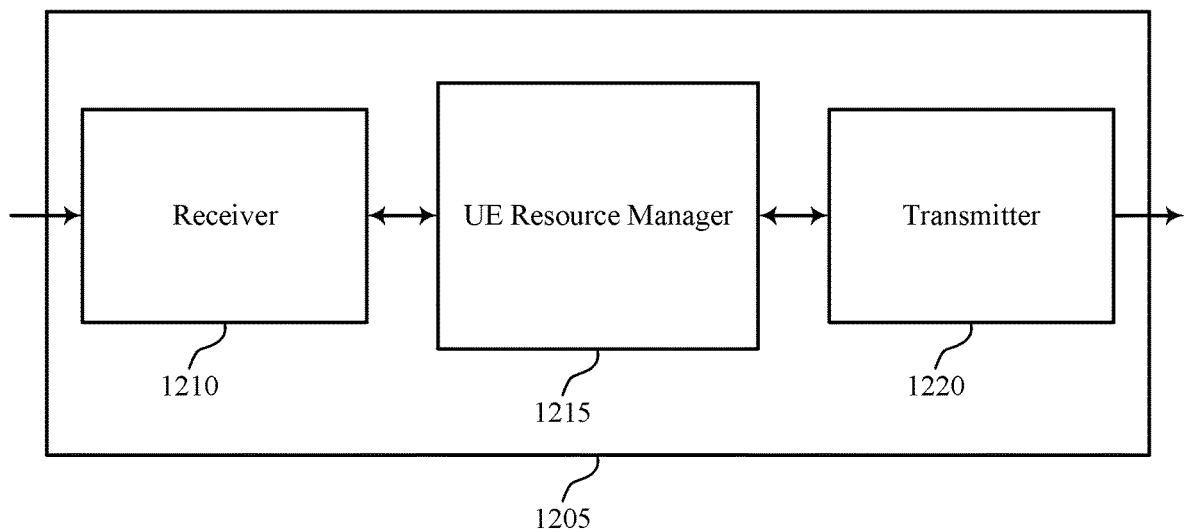
FIGS. 12 through 14 show block diagrams of a device that supports partial subframe transmission techniques in shared radio frequency spectrum in accordance with aspects of the present disclosure.

FIG. 12 shows a block diagram 1200 of a wireless device 1205 that supports partial subframe transmission techniques in shared radio frequency spectrum in accordance with aspects of the present disclosure. Wireless device 1205 may be an example of aspects of a UE 115 as described with reference to FIGS. 1 and 2. Wireless device 1205 may include receiver 1210, UE resource manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to partial subframe transmission techniques in shared radio frequency spectrum, etc.). Information may be passed on to other components of the device. The receiver 1210 may be an example of aspects of the transceiver 1535 described with reference to FIG. 15. The receiver 1210 may utilize a single antenna or a set of antennas.

UE resource manager 1215 may be an example of aspects of the UE resource manager 1515 described with reference to FIG. 15. UE resource manager 1215 and/or at least some of its various sub-components may be implemented in hardware, software executed by a processor, firmware, or any combination thereof. If implemented in software executed by a processor, the functions of the UE resource manager 1215 and/or at least some of its various sub-components may be executed by a general-purpose processor, a DSP, an ASIC, an FPGA or other PLD, discrete gate or transistor logic, discrete hardware components, or any combination thereof designed to perform the functions described in the present disclosure.

The UE resource manager 1215 and/or at least some of its various sub-components may be physically located at various positions, including being distributed such that portions of functions are implemented at different physical locations by one or more physical devices. In some examples, UE resource manager 1215 and/or at least some of its various sub-components may be a separate and distinct component in accordance with various aspects of the present disclosure. In other examples, UE resource manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE resource manager 1215 may identify a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum. UE resource manager 1215 may monitor transmissions in the shared radio frequency spectrum at a set of predefined time points of the full subframe duration for an indication of a first transmission, determine a starting position of the first transmission within the first full subframe duration based on a first time point of the set of predefined time points of the indication of the first transmission. UE resource manager 1215 may receive, based on the starting position of the first transmission, the first transmission using a first partial subframe having the first partial subframe duration, a second partial subframe having the second partial subframe duration, or both the first partial subframe and the second partial subframe.

The UE resource manager 1215 may also identify a full subframe duration for use in wireless transmissions using shared radio frequency spectrum, a starting point of the full subframe duration being synchronized among two or more transmitters using the shared radio frequency spectrum and monitor transmissions in the shared radio frequency spectrum at a set of predefined time points of the full subframe duration for an indication of a starting position of a first transmission. UE resource manager 1215 may determine a partial subframe duration for the first transmission based on a difference between the starting position within the first full subframe duration and the full subframe duration and receive the first transmission using a first partial subframe having the partial subframe duration.

The UE resource manager 1215 may also receive a first downlink partial subframe in a downlink wireless transmission using a shared radio frequency spectrum band and identify a trigger to initiate uplink transmissions of an uplink grant in the first downlink partial subframe, the trigger indicating one or more of a starting point of an uplink wireless transmission or an ending point of the uplink wireless transmission. UE resource manager 1215 may transmit the uplink wireless transmission based on the uplink grant and the trigger.

Transmitter 1220 may transmit signals generated by other components of the device. In some cases, the transmitter 1220 may be collocated with a receiver 1210 in a transceiver module. For instance, the transmitter 1220 may be an example of aspects of the transceiver 1535 described with reference to FIG. 15. The transmitter 1220 may utilize a single antenna or a set of antennas.

Figure 13:
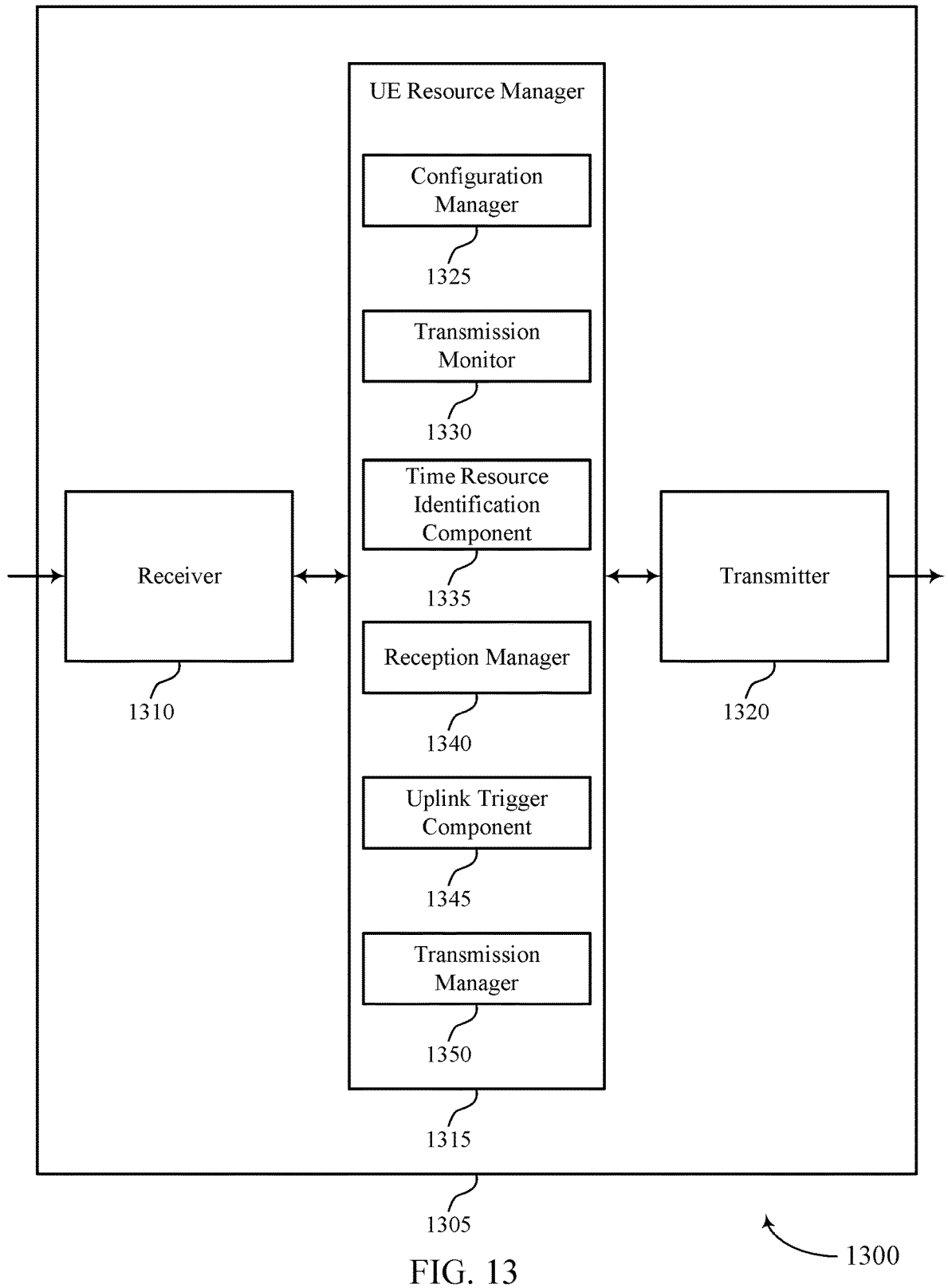

FIG. 13 shows a block diagram 1300 of a wireless device 1305 that supports partial subframe transmission techniques in shared radio frequency spectrum in accordance with aspects of the present disclosure. Wireless device 1305 may be an example of aspects of a wireless device 1205 or a UE 115 as described with reference to FIGS. 1, 2, and 12. Wireless device 1305 may include receiver 1310, UE resource manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to partial subframe transmission techniques in shared radio frequency spectrum). Information may be passed on to other components of the device. The receiver 1310 may be an example of aspects of the transceiver 1535 described with reference to FIG. 15. The receiver 1310 may utilize a single antenna or a set of antennas.

UE resource manager 1315 may be an example of aspects of the UE resource manager 1515 described with reference to FIG. 15. UE resource manager 1315 may also include configuration manager 1325, transmission monitor 1330, time resource identification component 1335, reception manager 1340, uplink trigger component 1345, and transmission manager 1350.

Configuration manager 1325 may identify a full subframe duration for use in wireless transmissions using shared radio frequency spectrum, a first partial subframe duration that is shorter than the full subframe duration, and a second partial subframe duration that is shorter than the first partial subframe duration. In some cases, a starting point of the full subframe duration is synchronized among two or more transmitters using the shared radio frequency spectrum. Configuration manager 1325 may, in some cases, receive configuration information that indicates the first partial subframe duration and the second partial subframe duration. In some examples, the configuration information is received in a physical downlink shared channel (PDSCH) transmission. In some aspects, the indication of the partial subframe duration includes DCI that indicates the partial subframe duration. In some instances, the second partial subframe duration corresponds to at least two (e.g., two or three) OFDM symbols.

In some cases, the configuration information further indicates an uplink partial subframe may be transmitted at an end of the first full subframe duration. In some examples, configuration manager 1325 may determine that an ending subframe of the uplink grant is an uplink partial subframe or an uplink full subframe based on information in a trigger.

Transmission monitor 1330 may monitor transmissions in the shared radio frequency spectrum at a set of predefined time points of the full subframe duration for an indication of a first transmission.

Time resource identification component 1335 may determine a starting position of the first transmission within the first full subframe duration based on a first time point of the set of predefined time points of the indication of the first transmission. In some cases, time resource identification component 1335 may determine a partial subframe duration for the first transmission based on a difference between the starting position within the first full subframe duration and the full subframe duration. In some examples, the partial subframe duration corresponds to an integer number of two-OFDM-symbol TTIs. In some aspects, the determining includes determining that the starting position of the first transmission corresponds to a start of a slot within the full subframe duration, where the first partial subframe duration corresponds to a duration of the slot. In some instances, the determining includes determining that a difference between the starting position of the first transmission and an end of the full subframe duration is less than the first partial subframe duration, and the receiving includes receiving the first transmission using the second partial subframe.

In some cases, the determining includes determining that the starting position corresponds to symbol 11 of the full subframe duration, and the receiving includes receiving the first transmission using the second partial subframe which corresponds to 3 symbols of the full subframe duration. In some cases, the determining includes determining that a difference between the starting position of the first transmission and an end of the full subframe duration is more than the first partial subframe duration, and the receiving includes receiving the first transmission using both the first partial subframe and the second partial subframe. In some examples, the starting position corresponds to symbols 0, 4, 7, and 11 of the full subframe duration. In some aspects, the determining includes determining that the starting position corresponds to symbol 4 of the full subframe duration, and the receiving includes receiving the first transmission using the second partial subframe which corresponds to 3 symbols and the first partial subframe which corresponds to a slot of the full subframe duration.

In some instances, the starting location corresponds to symbol 1, 3, 5, 8, 10, or 12 of the full subframe duration. In some cases, the partial subframe spans an entire duration between the starting position and an end of the full subframe duration and is scheduled in a single sPDCCH transmission.

In some examples, the partial subframe duration corresponds to a number of OFDM symbols between the indication and an end of the full subframe duration. In some aspects, the determining includes determining that the starting position corresponds to symbol 7 of the full subframe duration, and the receiving includes receiving the first transmission using the first partial subframe which corresponds to a slot of the full subframe duration.

Reception manager 1340 may receive, based on the starting position of the first transmission, the first transmission using a first partial subframe having the first partial subframe duration, a second partial subframe having the second partial subframe duration, or both the first partial subframe and the second partial subframe. Reception manager 1340 may decode the received first transmission based on a TBS scaling factor, in some cases.

Uplink trigger component 1345 may identify a trigger to initiate uplink transmissions of an uplink grant in the first downlink partial subframe, the trigger indicating one or more of a starting point of an uplink wireless transmission or an ending point of the uplink wireless transmission. In some cases, the trigger indicates the starting point and a total duration of the uplink grant. In some examples, the trigger indicates that the uplink grant includes one or more slot TTIs, one or more two-symbol TTIs, or a combination thereof.

Transmission manager 1350 may transmit the uplink wireless transmission based on the uplink grant and the trigger and transmit the uplink transmission at the starting point of the uplink wireless transmission, where the starting point is in a second partial subframe following the first downlink partial subframe.

Transmitter 1320 may transmit signals generated by other components of the device. In some cases, the transmitter 1320 may be collocated with a receiver 1310 in a transceiver module. For instance, the transmitter 1320 may be an example of aspects of the transceiver 1535 described with reference to FIG. 15. The transmitter 1320 may utilize a single antenna or a set of antennas.

Figure 14:
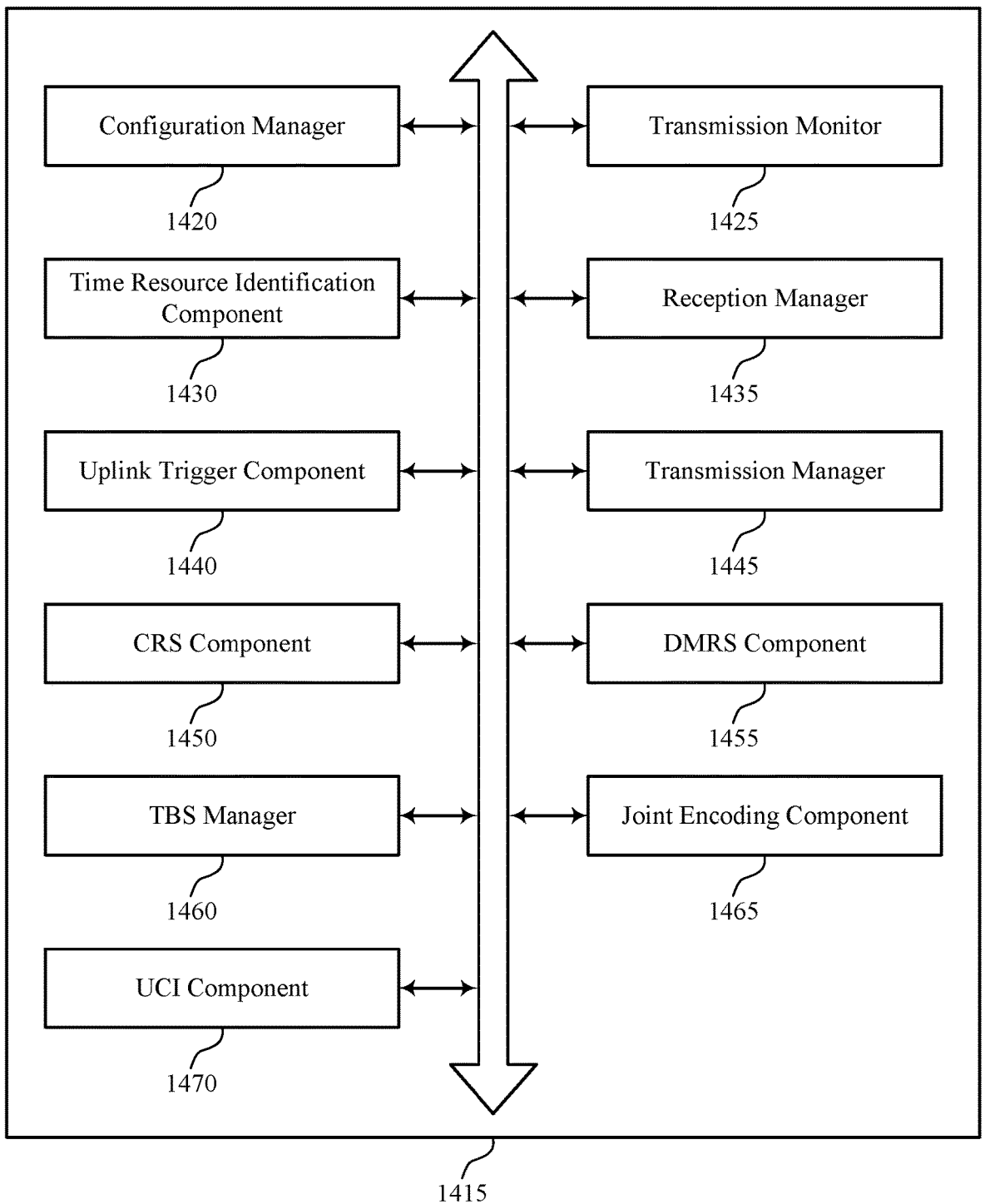

FIG. 14 shows a block diagram 1400 of a UE resource manager 1415 that supports partial subframe transmission techniques in shared radio frequency spectrum in accordance with aspects of the present disclosure. The UE resource manager 1415 may be an example of aspects of a UE resource manager 1515 described with reference to FIGS. 12, 13, and 15. The UE resource manager 1415 may include configuration manager 1420, transmission monitor 1425, time resource identification component 1430, reception manager 1435, uplink trigger component 1440, transmission manager 1445, CRS component 1450, DMRS component 1455, TBS manager 1460, joint encoding component 1465, and UCI component 1470. Each of these modules may communicate, directly or indirectly, with one another (e.g., via one or more buses).

Configuration manager 1420 may identify a full subframe duration for use in wireless transmissions using shared radio frequency spectrum, a first partial subframe duration that is shorter than the full subframe duration, and a second partial subframe duration that is shorter than the first partial subframe duration. In some cases, a starting point of the full subframe duration is synchronized among two or more transmitters using the shared radio frequency spectrum. Configuration manager 1420 may, in some cases, receive configuration information that indicates the first partial subframe duration and the second partial subframe duration. In some examples, the configuration information is received in a PDSCH transmission. In some aspects, the indication of the partial subframe duration includes DCI that indicates the partial subframe duration. In some cases, the second partial subframe duration corresponds to three OFDM symbols. In some instances, the second partial subframe duration corresponds to two OFDM symbols.

In some cases, the configuration information further indicates an uplink partial subframe may be transmitted at an end of the first full subframe duration. In some examples, configuration manager 1420 may determine that an ending subframe of the uplink grant is an uplink partial subframe or an uplink full subframe based on information in a trigger.

Transmission monitor 1425 may monitor transmissions in the shared radio frequency spectrum at a set of predefined time points of the full subframe duration for an indication of a first transmission and monitor transmissions in the shared radio frequency spectrum at a set of predefined time points of the full subframe duration for an indication of a starting position of a first transmission.

Time resource identification component 1430 may determine a starting position of the first transmission within the first full subframe duration based on a first time point of the set of predefined time points of the indication of the first transmission. In some cases, time resource identification component 1430 may determine a partial subframe duration for the first transmission based on a difference between the starting position within the first full subframe duration and the full subframe duration. In some examples, the partial subframe duration corresponds to an integer number of two-OFDM-symbol TTIs. In some aspects, the determining includes determining that the starting position of the first transmission corresponds to a start of a slot within the full subframe duration, and the first partial subframe duration corresponds to a duration of the slot. In some instances, the determining includes determining that a difference between the starting position of the first transmission and an end of the full subframe duration is less than the first partial subframe duration, and the receiving includes receiving the first transmission using the second partial subframe.

In some cases, the determining includes determining that the starting position corresponds to symbol 11 of the full subframe duration, and the receiving includes receiving the first transmission using the second partial subframe which corresponds to 3 symbols of the full subframe duration. In some examples, the determining includes determining that a difference between the starting position of the first transmission and an end of the full subframe duration is more than the first partial subframe duration, and the receiving includes receiving the first transmission using both the first partial subframe and the second partial subframe. In some aspects, the starting position corresponds to symbols 0, 4, 7, and 11 of the full subframe duration. In some instances, the determining includes determining that the starting position corresponds to symbol 4 of the full subframe duration, and the receiving includes receiving the first transmission using the second partial subframe which corresponds to 3 symbols and the first partial subframe which corresponds to a slot of the full subframe duration.

In some cases, the starting location corresponds to symbol 1, 3, 5, 8, 10, or 12 of the full subframe duration. In some examples, the partial subframe spans an entire duration between the starting position and an end of the full subframe duration and is scheduled in a single sPDCCH transmission. In some aspects, the partial subframe duration corresponds to a number of OFDM symbols between the indication and an end of the full subframe duration. In some instances, the determining includes determining that the starting position corresponds to symbol 7 of the full subframe duration, and the receiving includes receiving the first transmission using the first partial subframe which corresponds to a slot of the full subframe duration.

Reception manager 1435 may receive, based on the starting position of the first transmission, the first transmission using a first partial subframe having the first partial subframe duration, a second partial subframe having the second partial subframe duration, or both the first partial subframe and the second partial subframe. Reception manager 1435 may decode the received first transmission based on a TBS scaling factor, in some cases.

Uplink trigger component 1440 may identify a trigger to initiate uplink transmissions of an uplink grant in the first downlink partial subframe, the trigger indicating one or more of a starting point of an uplink wireless transmission or an ending point of the uplink wireless transmission. In some cases, the trigger indicates the starting point and a total duration of the uplink grant. In some examples, the trigger indicates that the uplink grant includes one or more slot TTIs, one or more two-symbol TTIs, or a combination thereof.

Transmission manager 1445 may transmit the uplink wireless transmission based on the uplink grant and the trigger and transmit the uplink transmission at the starting point of the uplink wireless transmission, where the starting point is in a second partial subframe following the first downlink partial subframe.

CRS component 1450 may monitor the set of predefined time points for a CRS (or bandwidth part specific reference signal) that indicates the starting position. DMRS component 1455 may monitor the set of predefined time points for a DMRS (e.g., a wideband DMRS) in an initial OFDM symbol of the first transmission to indicate the starting position. TBS manager 1460 may identify a TBS scaling factor based on the starting position. Joint encoding component 1465 may jointly encode uplink data across two or more TTIs. UCI component 1470 may transmit UCI during one or more of the TTIs, such as ACK/NACK information or RI information.

Figure 15:
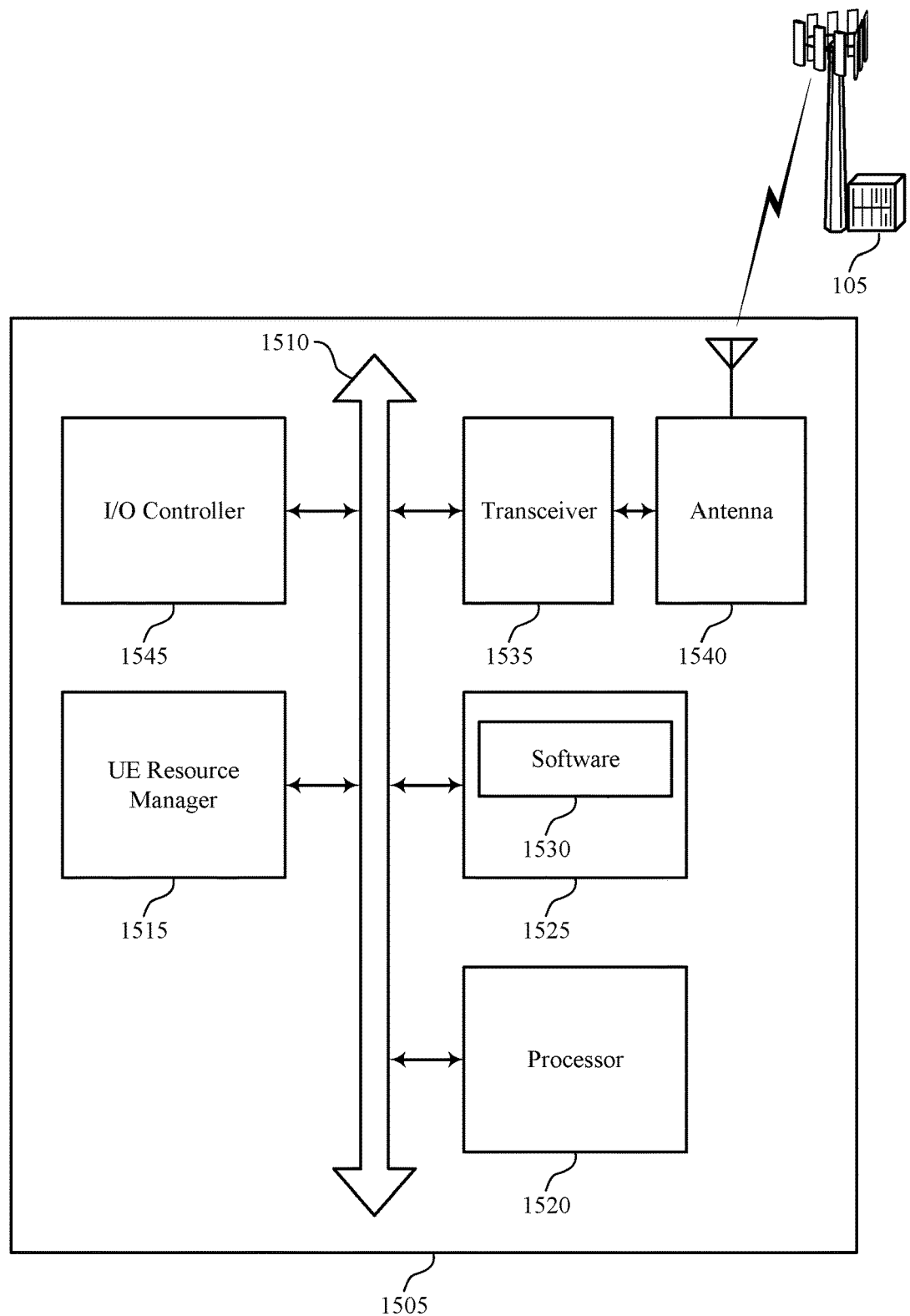
FIG. 15 illustrates a block diagram of a system including a user equipment (UE) that supports partial subframe transmission techniques in shared radio frequency spectrum in accordance with aspects of the present disclosure.

FIG. 15 shows a diagram of a system 1500 including a device 1505 that supports partial subframe transmission techniques in shared radio frequency spectrum in accordance with aspects of the present disclosure. Device 1505 may be an example of or include the components of UE 115 as described above, e.g., with reference to FIG. 1. Device 1505 may include components for bi-directional voice and data communications including components for transmitting and receiving communications, including UE resource manager 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting partial subframe transmission techniques in shared radio frequency spectrum).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support partial subframe transmission techniques in shared radio frequency spectrum. Software 1530 may be stored in a non-transitory computer-readable medium such as system memory or other memory. In some cases, the software 1530 may not be directly executable by the processor 1520 but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other examples, I/O controller 1545 may represent or interact with a modem, a keyboard, a mouse, a touchscreen, or a similar device. In some aspects, I/O controller 1545 may be implemented as part of a processor. In some instances, a user may interact with device 1505 via I/O controller 1545 or via hardware components controlled by I/O controller 1545.

Figure 16:
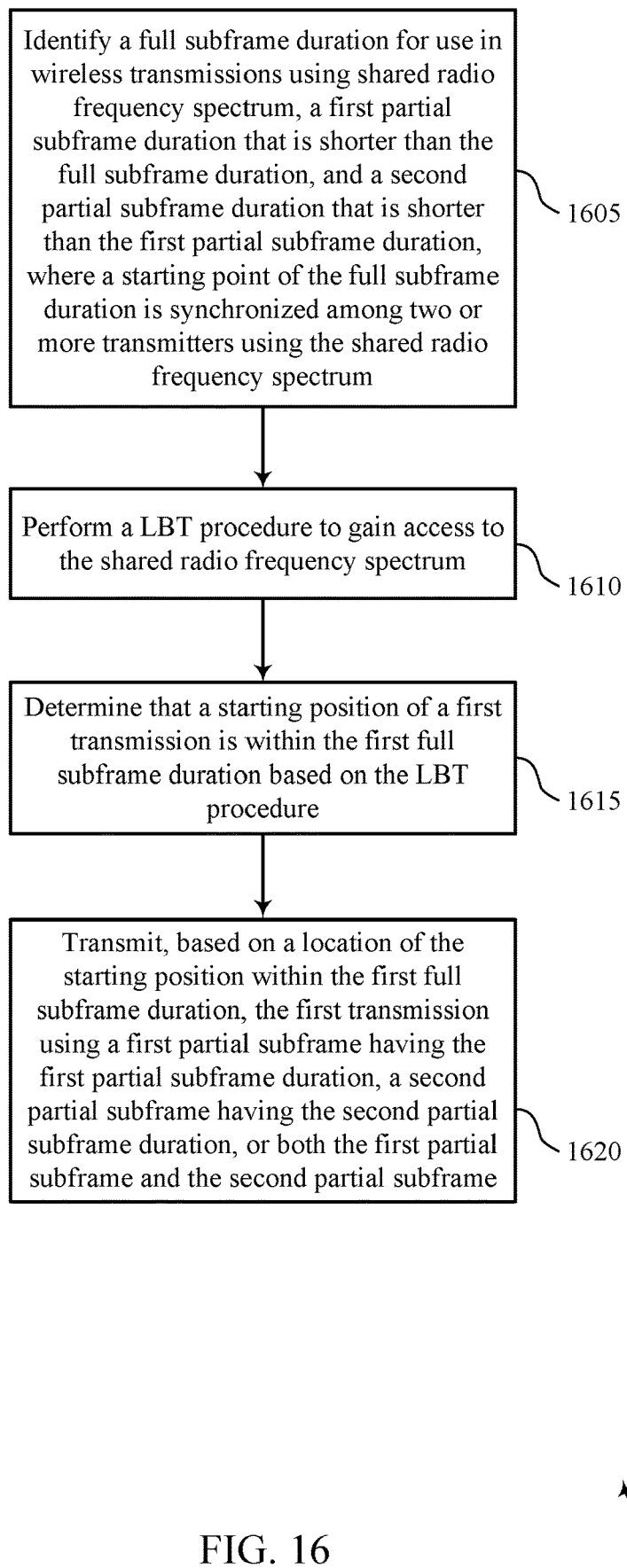
FIGS. 16 through 21 illustrate methods for partial subframe transmission techniques in shared radio frequency spectrum in accordance with aspects of the present disclosure.

FIG. 16 shows a flowchart illustrating a method 1600 for partial subframe transmission techniques in shared radio frequency spectrum in accordance with aspects of the present disclosure. The operations of method 1600 may be implemented by a base station 105 or its components as described herein. For example, the operations of method 1600 may be performed by a base station resource manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may identify a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum. The operations of block 1605 may be performed according to the methods described with reference to FIGS. 1 through 7. In certain examples, aspects of the operations of block 1605 may be performed by a configuration manager as described with reference to FIGS. 8 through 11.

At block 1610 the base station 105 may perform an LBT procedure to gain access to the shared radio frequency spectrum. The operations of block 1610 may be performed according to the methods described with reference to FIGS. 1 through 7. In certain examples, aspects of the operations of block 1610 may be performed by an LBT manager as described with reference to FIGS. 8 through 11.

At block 1615 the base station 105 may determine that a starting position of a first transmission is within the first full subframe duration based on the LBT procedure. The operations of block 1615 may be performed according to the methods described with reference to FIGS. 1 through 7. In certain examples, aspects of the operations of block 1615 may be performed by a time resource identification component as described with reference to FIGS. 8 through 11.

At block 1620 the base station 105 may transmit, based at least in part on a location of the starting position within the first full subframe duration, the first transmission using a first partial subframe having the first partial subframe duration, a second partial subframe having the second partial subframe duration, or both the first partial subframe and the second partial subframe. The operations of block 1620 may be performed according to the methods described with reference to FIGS. 1 through 7. In certain examples, aspects of the operations of block 1620 may be performed by a transmission manager as described with reference to FIGS. 8 through 11.

Figure 17:
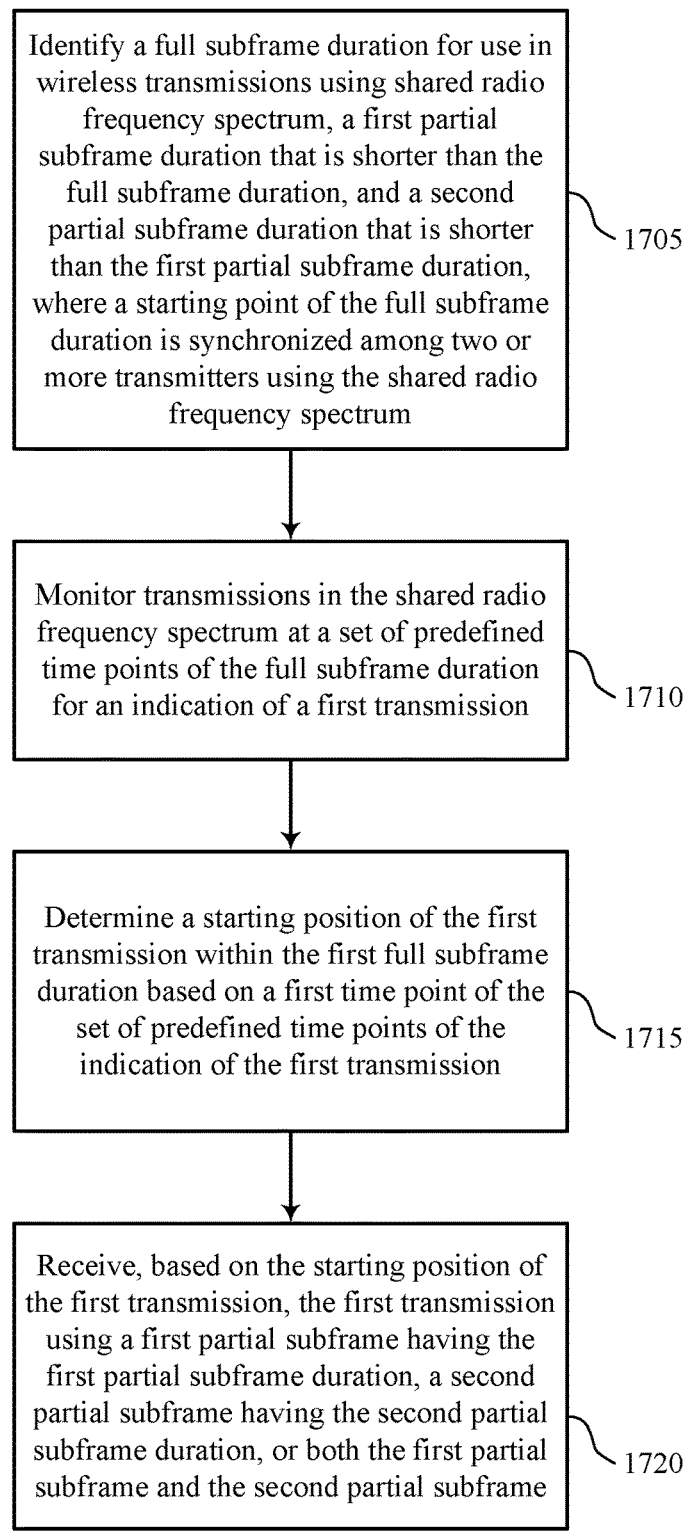

FIG. 17 shows a flowchart illustrating a method 1700 for partial subframe transmission techniques in shared radio frequency spectrum in accordance with aspects of the present disclosure. The operations of method 1700 may be implemented by a UE 115 or its components as described herein. For example, the operations of method 1700 may be performed by a UE resource manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify a full subframe duration for use in wireless transmissions using shared radio frequency spectrum, a first partial subframe duration that is shorter than the full subframe duration, and a second partial subframe duration that is shorter than the first partial subframe duration, where a starting point of the full subframe duration is synchronized among two or more transmitters using the shared radio frequency spectrum. The operations of block 1705 may be performed according to the methods described with reference to FIGS. 1 through 7. In certain examples, aspects of the operations of block 1705 may be performed by a configuration manager as described with reference to FIGS. 12 through 15.

At block 1710 the UE 115 may monitor transmissions in the shared radio frequency spectrum at a plurality of predefined time points of the full subframe duration for an indication of a first transmission. The operations of block 1710 may be performed according to the methods described with reference to FIGS. 1 through 7. In certain examples, aspects of the operations of block 1710 may be performed by a transmission monitor as described with reference to FIGS. 12 through 15.

At block 1715 the UE 115 may determine a starting position of the first transmission within the first full subframe duration based at least in part on a first time point of the plurality of predefined time points of the indication of the first transmission. The operations of block 1715 may be performed according to the methods described with reference to FIGS. 1 through 7. In certain examples, aspects of the operations of block 1715 may be performed by a time resource identification component as described with reference to FIGS. 12 through 15.

At block 1720 the UE 115 may receive, based at least in part on the starting position of the first transmission, the first transmission using a first partial subframe having the first partial subframe duration, a second partial subframe having the second partial subframe duration, or both the first partial subframe and the second partial subframe. The operations of block 1720 may be performed according to the methods described with reference to FIGS. 1 through 7. In certain examples, aspects of the operations of block 1720 may be performed by a reception manager as described with reference to FIGS. 12 through 15.

Figure 18:
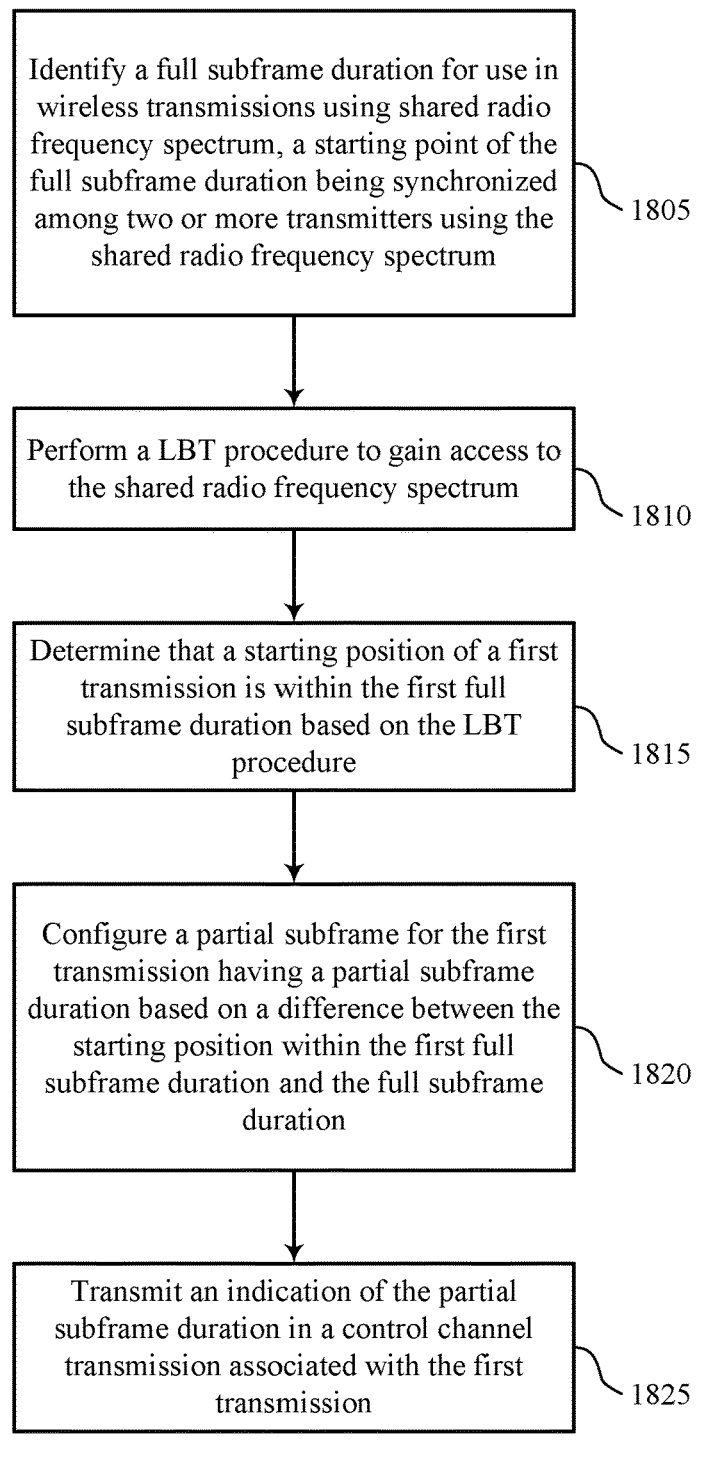

FIG. 18 shows a flowchart illustrating a method 1800 for partial subframe transmission techniques in shared radio frequency spectrum in accordance with aspects of the present disclosure. The operations of method 1800 may be implemented by a base station 105 or its components as described herein. For example, the operations of method 1800 may be performed by a base station resource manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify a full subframe duration for use in wireless transmissions using shared radio frequency spectrum, a starting point of the full subframe duration being synchronized among two or more transmitters using the shared radio frequency spectrum. The operations of block 1805 may be performed according to the methods described with reference to FIGS. 1 through 7. In certain examples, aspects of the operations of block 1805 may be performed by a configuration manager as described with reference to FIGS. 8 through 11.

At block 1810 the base station 105 may perform an LBT procedure to gain access to the shared radio frequency spectrum. The operations of block 1810 may be performed according to the methods described with reference to FIGS. 1 through 7. In certain examples, aspects of the operations of block 1810 may be performed by an LBT manager as described with reference to FIGS. 8 through 11.

At block 1815 the base station 105 may determine that a starting position of a first transmission is within the first full subframe duration based on the LBT procedure. The operations of block 1815 may be performed according to the methods described with reference to FIGS. 1 through 7. In certain examples, aspects of the operations of block 1815 may be performed by a time resource identification component as described with reference to FIGS. 8 through 11.

At block 1820 the base station 105 may configure a partial subframe for the first transmission having a partial subframe duration based at least in part on a difference between the starting position within the first full subframe duration and the full subframe duration. The operations of block 1820 may be performed according to the methods described with reference to FIGS. 1 through 7. In certain examples, aspects of the operations of block 1820 may be performed by a resource allocation component as described with reference to FIGS. 8 through 11.

At block 1825 the base station 105 may transmit an indication of the partial subframe duration in a control channel transmission associated with the first transmission. The operations of block 1825 may be performed according to the methods described with reference to FIGS. 1 through 7. In certain examples, aspects of the operations of block 1825 may be performed by a transmission manager as described with reference to FIGS. 8 through 11.

Figure 19:
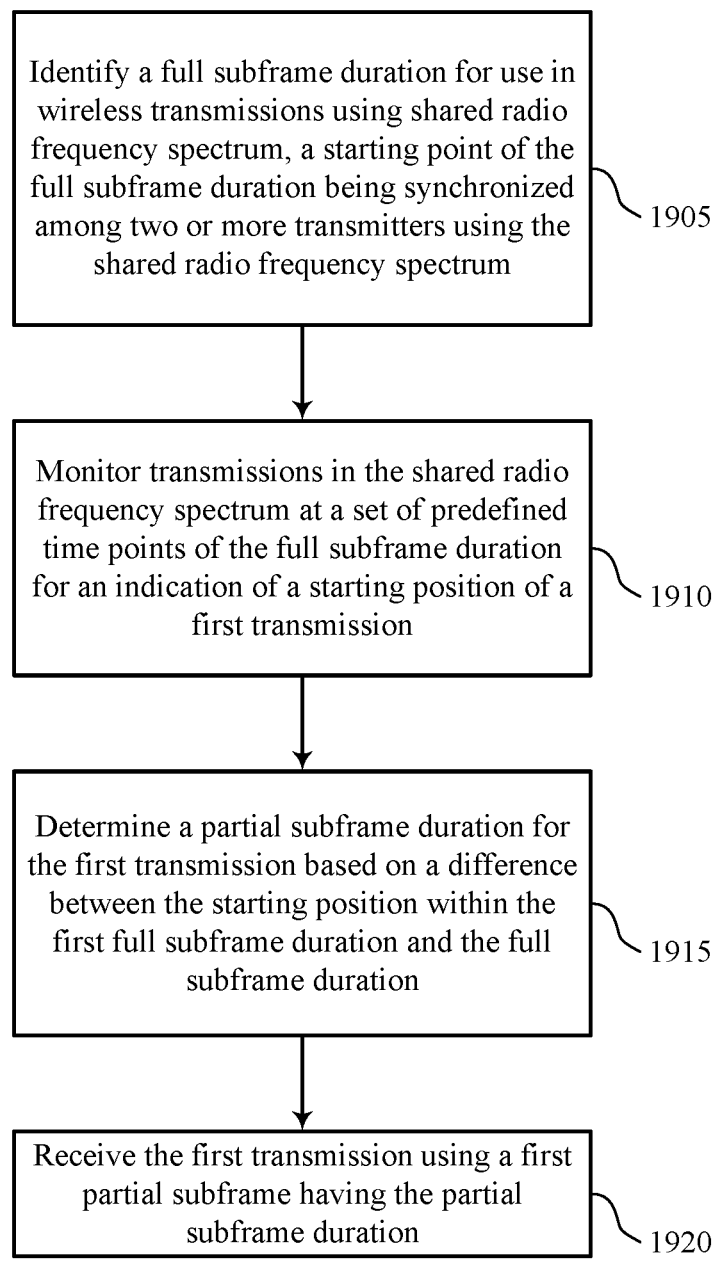

FIG. 19 shows a flowchart illustrating a method 1900 for partial subframe transmission techniques in shared radio frequency spectrum in accordance with aspects of the present disclosure. The operations of method 1900 may be implemented by a UE 115 or its components as described herein. For example, the operations of method 1900 may be performed by a UE resource manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may identify a full subframe duration for use in wireless transmissions using shared radio frequency spectrum, a starting point of the full subframe duration being synchronized among two or more transmitters using the shared radio frequency spectrum. The operations of block 1905 may be performed according to the methods described with reference to FIGS. 1 through 7. In certain examples, aspects of the operations of block 1905 may be performed by a configuration manager as described with reference to FIGS. 12 through 15.

At block 1910 the UE 115 may monitor transmissions in the shared radio frequency spectrum at a plurality of predefined time points of the full subframe duration for an indication of a starting position of a first transmission. The operations of block 1910 may be performed according to the methods described with reference to FIGS. 1 through 7. In certain examples, aspects of the operations of block 1910 may be performed by a transmission monitor as described with reference to FIGS. 12 through 15.

At block 1915 the UE 115 may determine a partial subframe duration for the first transmission based at least in part on a difference between the starting position within the first full subframe duration and the full subframe duration. The operations of block 1915 may be performed according to the methods described with reference to FIGS. 1 through 7. In certain examples, aspects of the operations of block 1915 may be performed by a time resource identification component as described with reference to FIGS. 12 through 15.

At block 1920 the UE 115 may receive the first transmission using a first partial subframe having the partial subframe duration. The operations of block 1920 may be performed according to the methods described with reference to FIGS. 1 through 7. In certain examples, aspects of the operations of block 1920 may be performed by a reception manager as described with reference to FIGS. 12 through 15.

Figure 20:
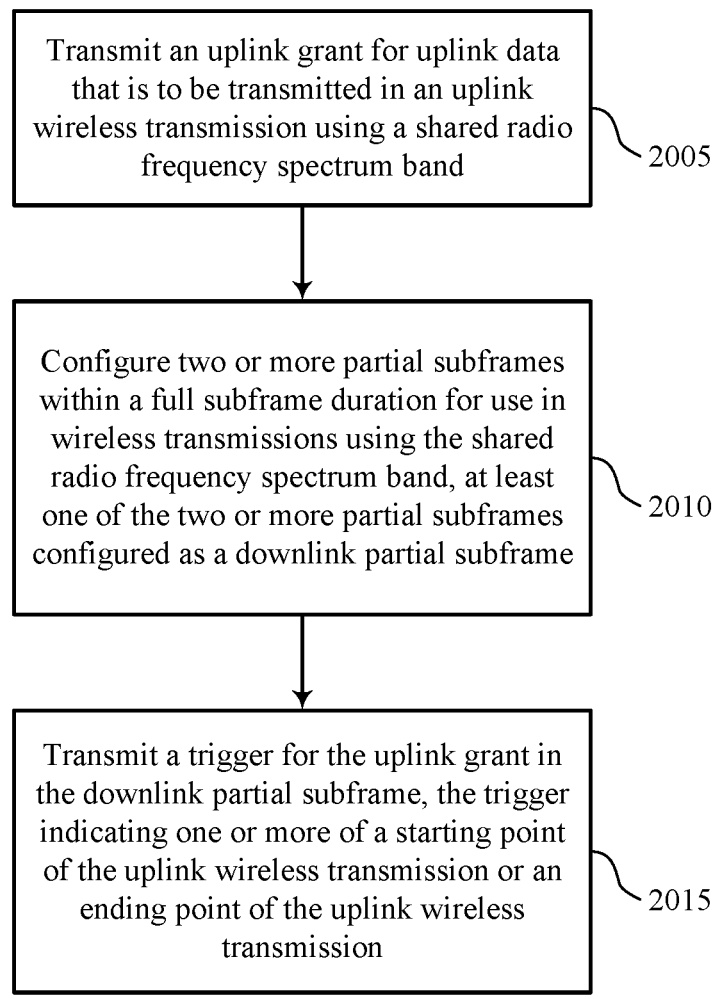

FIG. 20 shows a flowchart illustrating a method 2000 for partial subframe transmission techniques in shared radio frequency spectrum in accordance with aspects of the present disclosure. The operations of method 2000 may be implemented by a base station 105 or its components as described herein. For example, the operations of method 2000 may be performed by a base station resource manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may transmit an uplink grant for uplink data that is to be transmitted in an uplink wireless transmission using a shared radio frequency spectrum band. The operations of block 2005 may be performed according to the methods described with reference to FIGS. 1 through 7. In certain examples, aspects of the operations of block 2005 may be performed by a resource allocation component as described with reference to FIGS. 8 through 11.

At block 2010 the base station 105 may configure two or more partial subframes within a full subframe duration for use in wireless transmissions using the shared radio frequency spectrum band, at least one of the two or more partial subframes configured as a downlink partial subframe. The operations of block 2010 may be performed according to the methods described with reference to FIGS. 1 through 7. In certain examples, aspects of the operations of block 2010 may be performed by a configuration manager as described with reference to FIGS. 8 through 11.

At block 2015 the base station 105 may transmit a trigger for the uplink grant in the downlink partial subframe, the trigger indicating one or more of a starting point of the uplink wireless transmission or an ending point of the uplink wireless transmission. The operations of block 2015 may be performed according to the methods described with reference to FIGS. 1 through 7. In certain examples, aspects of the operations of block 2015 may be performed by a uplink trigger component as described with reference to FIGS. 8 through 11.

Figure 21:
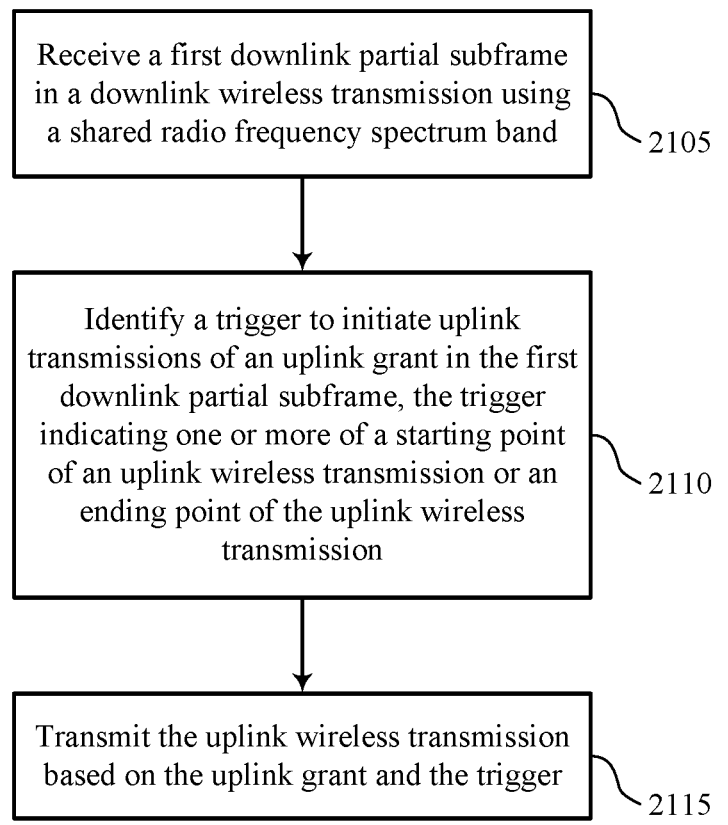

FIG. 21 shows a flowchart illustrating a method 2100 for partial subframe transmission techniques in shared radio frequency spectrum in accordance with aspects of the present disclosure. The operations of method 2100 may be implemented by a UE 115 or its components as described herein. For example, the operations of method 2100 may be performed by a UE resource manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive a first downlink partial subframe in a downlink wireless transmission using a shared radio frequency spectrum band. The operations of block 2105 may be performed according to the methods described with reference to FIGS. 1 through 7. In certain examples, aspects of the operations of block 2105 may be performed by a reception manager as described with reference to FIGS. 12 through 15.

At block 2110 the UE 115 may identify a trigger to initiate uplink transmissions of an uplink grant in the first downlink partial subframe, the trigger indicating one or more of a starting point of an uplink wireless transmission or an ending point of the uplink wireless transmission. The operations of block 2110 may be performed according to the methods described with reference to FIGS. 1 through 7. In certain examples, aspects of the operations of block 2110 may be performed by a uplink trigger component as described with reference to FIGS. 12 through 15.

At block 2115 the UE 115 may transmit the uplink wireless transmission based at least in part on the uplink grant and the trigger. The operations of block 2115 may be performed according to the methods described with reference to FIGS. 1 through 7. In certain examples, aspects of the operations of block 2115 may be performed by a transmission manager as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    transmitting an uplink grant for uplink data that is to be transmitted in an uplink wireless transmission using a shared radio frequency spectrum band;
    configuring two or more partial subframes within a single subframe for use in wireless transmissions using the shared radio frequency spectrum band, at least one of the two or more partial subframes configured as a downlink partial subframe;
    configuring an ending subframe of the uplink grant to be a partial subframe; and
    transmitting a trigger for the uplink grant in the downlink partial subframe, the trigger indicating a starting point of the uplink wireless transmission and the configuration of the ending subframe, wherein the starting point of the uplink wireless transmission is in a second partial subframe following the downlink partial subframe.

2. The method of claim 1, further comprising:
    determining a total duration of the uplink grant, and wherein the trigger indicates the starting point and the total duration of the uplink grant.

3. The method of claim 1, wherein the ending subframe is configured as a partial subframe when the ending subframe is in a same transmission opportunity as the uplink grant.

4. The method of claim 1, wherein the trigger indicates that the uplink grant includes one or more slot transmission time intervals (TTIs), one or more two-symbol TTIs, or a combination thereof.

5. The method of claim 4, wherein data transmitted in the uplink wireless transmission is jointly encoded across two or more TTIs.

6. The method of claim 4, further comprising:
    configuring uplink control information (UCI) to be transmitted during one or more of the TTIs.

7. A method for wireless communication, comprising:
    receiving a first downlink partial subframe in a downlink wireless transmission using a shared radio frequency spectrum band;
    identifying a trigger to initiate uplink transmissions of an uplink grant in the first downlink partial subframe, the trigger indicating a starting point of an uplink wireless transmission, wherein the starting point is in a second partial subframe following the first downlink partial subframe;
determining that an ending subframe of the uplink grant is an uplink partial subframe or an uplink single subframe based at least in part on information in the trigger; and
transmitting the uplink transmission at the starting point of the uplink wireless transmission based at least in part on the uplink grant and the trigger.

8. The method of claim 7, wherein the trigger indicates the starting point and a total duration of the uplink grant.

9. The method of claim 7, wherein the trigger indicates that the uplink grant includes one or more slot transmission time intervals (TTIs), one or more two-symbol TTIs, or a combination thereof.

10. The method of claim 9, further comprising:
jointly encoding uplink data across two or more TTIs.

11. The method of claim 9, further comprising:
transmitting uplink control information (UCI) during one or more of the TTIs.

12. An apparatus for wireless communication, in a system comprising:
a processor;
memory coupled with the processor; and
instructions stored in the memory, wherein the instructions are executable by the processor to:
transmit an uplink grant for uplink data that is to be transmitted in an uplink wireless transmission using a shared radio frequency spectrum band;
configure two or more partial subframes within a single subframe for use in wireless transmissions using the shared radio frequency spectrum band, at least one of the two or more partial subframes configured as a downlink partial subframe;
configure an ending subframe of the uplink grant to be a partial subframe; and
transmit a trigger for the uplink grant in the downlink partial subframe, the trigger indicating a starting point of the uplink wireless transmission and the configuration of the ending subframe, wherein the starting point of the uplink wireless transmission is in a second partial subframe following the downlink partial subframe.

13. The apparatus of claim 12, wherein the instructions are further executable by the processor to:
determine a total duration of the uplink grant, and wherein the trigger indicates the starting point and the total duration of the uplink grant.

14. The apparatus of claim 12, wherein the ending subframe is configured as a partial subframe when the ending subframe is in a same transmission opportunity as the uplink grant.

15. The apparatus of claim 12, wherein the trigger indicates that the uplink grant includes one or more slot transmission time intervals (TTIs), one or more two-symbol TTIs, or a combination thereof.

16. The apparatus of claim 15, wherein data transmitted in the uplink wireless transmission is jointly encoded across two or more TTIs.

17. The apparatus of claim 15, wherein the instructions are further executable by the processor to:
configure uplink control information (UCI) to be transmitted during one or more of the TTIs.

18. An apparatus for wireless communication, in a system comprising:
a processor;
memory coupled with the processor; and
instructions stored in the memory, wherein the instructions are executable by the processor to:
receive a first downlink partial subframe in a downlink wireless transmission using a shared radio frequency spectrum band;
identify a trigger to initiate uplink transmissions of an uplink grant in the first downlink partial subframe, the trigger indicating a starting point of an uplink wireless transmission, wherein the starting point is in a second partial subframe following the first downlink partial subframe;
determine that an ending subframe of the uplink grant is an uplink partial subframe or an uplink single subframe based at least in part on information in the trigger; and
transmit the uplink transmission at the starting point of the uplink wireless transmission based at least in part on the uplink grant and the trigger.

19. The apparatus of claim 18, wherein the trigger indicates the starting point and a total duration of the uplink grant.

20. The apparatus of claim 18, wherein the trigger indicates that the uplink grant includes one or more slot transmission time intervals (TTIs), one or more two-symbol TTIs, or a combination thereof.

21. The apparatus of claim 20, wherein the instructions are further executable by the processor to:
jointly encode uplink data across two or more TTIs.

22. The apparatus of claim 20, wherein the instructions are further executable by the processor to:
transmit uplink control information (UCI) during one or more of the TTIs.

* * * * *